US005666987A

United States Patent [19]
Combs

[11] Patent Number: 5,666,987
[45] Date of Patent: Sep. 16, 1997

[54] CHEMICAL DISPERSING APPARATUS

[76] Inventor: Glenn A. Combs, 1500 Glenmar Ave., Monroe, La. 71201

[21] Appl. No.: 409,408

[22] Filed: Mar. 24, 1995

[51] Int. Cl.[6] .......... B01D 11/02

[52] U.S. Cl. .......... 137/1; 137/268; 422/264; 239/310; 239/575

[58] Field of Search .......... 137/268, 544, 137/549, 550, 545, 1; 239/310, 10, 590, 575; 222/189.06, 189.08; 138/41; 422/256, 261, 264

[56] References Cited

U.S. PATENT DOCUMENTS

| | | | |
|---|---|---|---|
| 899,054 | 9/1908 | Johnson . | |
| 1,409,248 | 3/1922 | Sevcic . | |
| 1,753,508 | 4/1930 | Garrett | 137/544 X |
| 1,800,642 | 11/1931 | Johnson . | |
| 1,913,760 | 6/1933 | Johnson . | |
| 2,419,845 | 4/1947 | Merrick . | |
| 2,462,034 | 2/1949 | Zeck . | |
| 3,129,172 | 4/1964 | Dickey . | |
| 3,195,558 | 7/1965 | Klueber . | |
| 3,312,235 | 4/1967 | Graceman et al. | 137/268 |
| 3,351,290 | 11/1967 | Baldwin . | |
| 3,612,080 | 10/1971 | Schneider . | |
| 3,772,193 | 11/1973 | Nelli et al. . | |
| 3,906,994 | 9/1975 | Schön | 137/544 |
| 3,968,932 | 7/1976 | Kimmell . | |
| 4,026,673 | 5/1977 | Russo . | |
| 4,115,270 | 9/1978 | Phillips | 137/268 X |
| 4,250,910 | 2/1981 | King . | |
| 4,250,911 | 2/1981 | Kratz . | |
| 4,333,493 | 6/1982 | Beiswenger . | |
| 4,555,347 | 11/1985 | O'Dowd et al. . | |
| 5,178,181 | 1/1993 | Craig . | |
| 5,303,729 | 4/1994 | DeMarco . | |

*Primary Examiner*—Kevin Lee
*Attorney, Agent, or Firm*—John M. Harrison

[57] ABSTRACT

A device for dispersing solid, powder, granular, tablet or liquid forms of beneficial chemical(s) into a pressurized liquid stream, distributing variable quantities over adjustable time in variable concentrations of dispersed chemical(s) through other ancillary connected equipment, permitting dispensing of the resultant fluid of pressurized beneficial chemical(s) for treatment of living or growing matter, including: foliage, plants, trees, crops, shrubs, weeds, grass, fungi and insects to achieve a useful or beneficial purpose. The device includes an upright, vertical cylindrical container constructed in capacities from less than 1 gallon to 1000 gallons and fitted with one or more internal screens to obstruct the escape of solid particles of a specific size into the product liquid stream. The design permits fresh supply liquid to contact chemical(s) in radial and upflow axial-radial flow patterns.

The container and attachments are designed to withstand high fluid pressures [up to 200 psig] without rupture or leakage. The device is connected to other installed in-ground pipes attached to spraying nozzles, sprinklers or sprinkler systems or flexible loose hoses or rigid pipe lying on the ground and further attached to sprayer devices such as hand-held nozzles, sprinklers, sprayers or spargers to be used manually, in semi-automatic or in fully automatic modes to disperse chemical(s). The device, which is formed from metal and/or thermal plastic materials and elastomers, uses valves to regulate chemical dispersement.

33 Claims, 14 Drawing Sheets

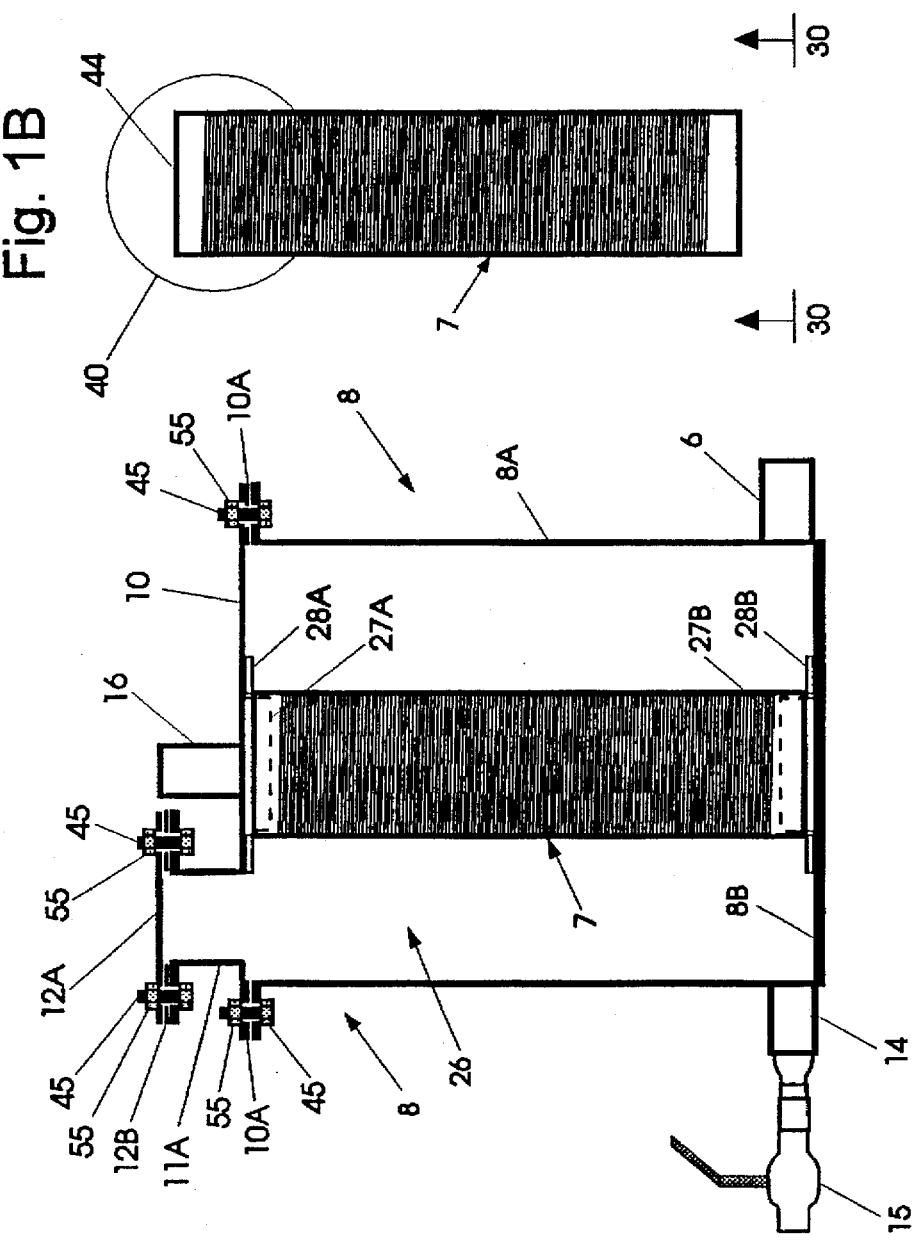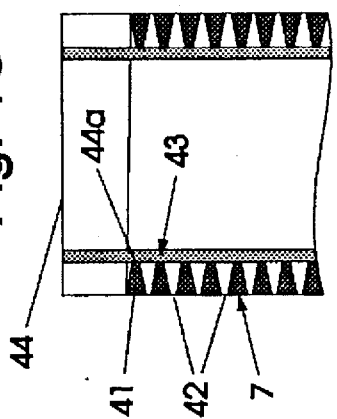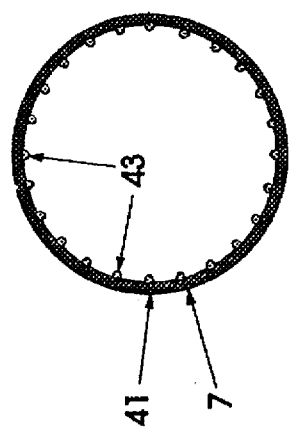

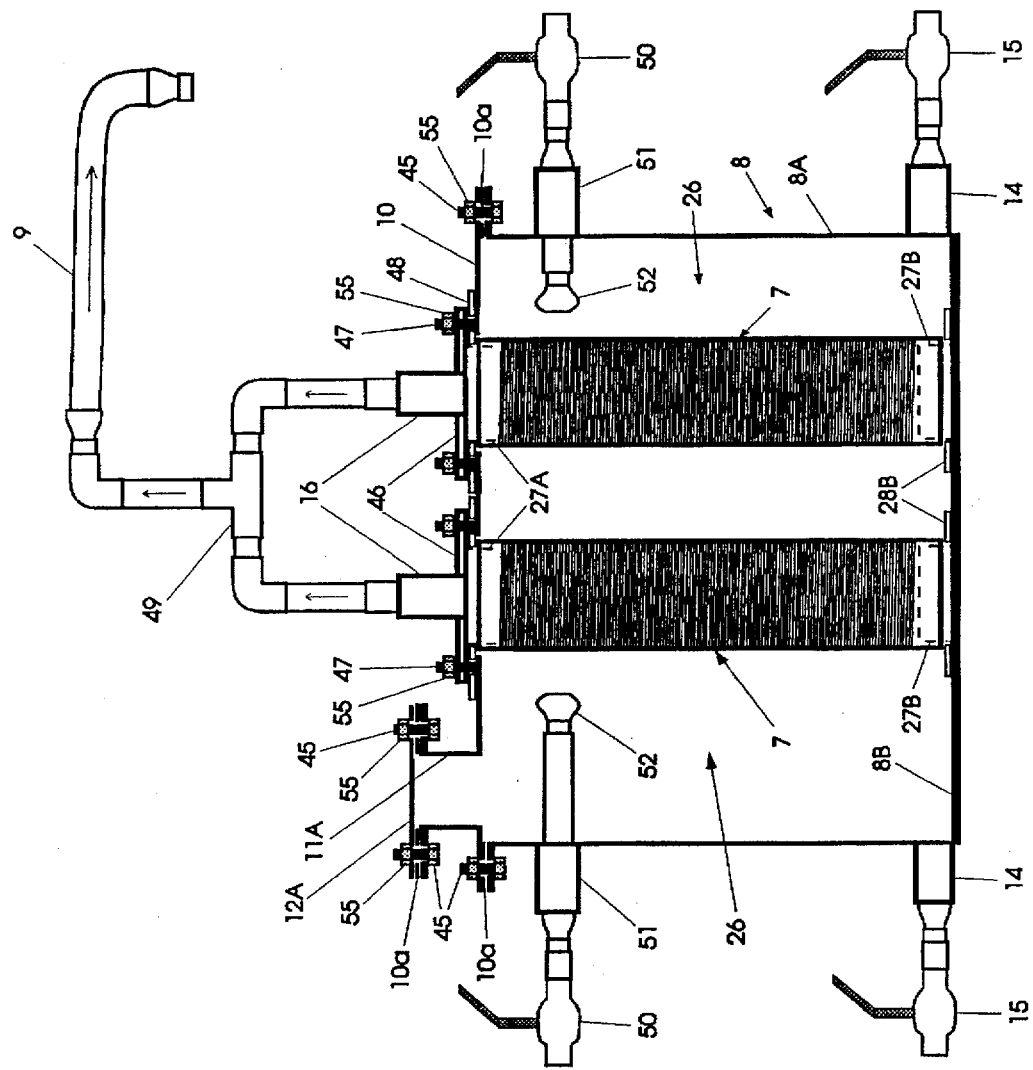

CHEMICAL DISPERSING APPARATUS

BACKGROUND OF THE INVENTION

1. Field of the Invention

Beneficial chemicals are used for the treatment of living or growing vegetation, foliage, plants, trees, crops, shrubs, weeds, grass, fungi and insects to achieve a useful or beneficial purpose. Examples include fertilizers to produce growth of lawns, trees, flowers, shrubs, fruits and vegetables, fungicides to control molds on plants, such as roses, herbicides to control weeds in crops, flower beds or lawns, and well known agricultural chemicals. These beneficial chemicals are manufactured and marketed for private consumer uses, as well as commercial uses. The typical method of application of such beneficial chemicals is directly on the living or growing matter. Solid fertilizers and other solid chemicals are usually distributed by solid particle scatter devices over the landscape to distribute such chemicals over sod, vegetation or other living matter. Solid chemicals may alternately be dispersed with hose sprayers, incorporating chemicals into a cartridge connected to pressurized lawn and garden hoses. Other solid chemical dispersement devices include chemical containers of varying design for gradually dissolving or suspending solid chemicals and flowing the resultant aqueous stream through irrigation lines, sprinklers or sprayers.

Liquid chemicals are dispersed using pressurized sprayers containing batches of liquid or dissolved solid chemicals in water, whereby compressed air provides fluid movement through hand-held sprayers or sprinkling nozzles. Alternately, atmospheric pressure containers containing batches of liquid-dissolved chemicals are pumped through hoses to distribution systems. These existing chemical dispersement methods all facilitate distribution of beneficial chemicals, generally with integrated human intervention. Of the various existing chemical applicators, each has design drawbacks, including cost, complexity and/or limited usefulness.

My new device for distributing beneficial chemicals dispenses solid and liquid chemicals by manual distribution methods, as well as semi-automatic or automatic methods, with or without continuous human intervention. The device may be constructed in a wide range of sizes for varying purposes, including home gardening, automated private lawn, tree, flower bed and shrub chemical treatment during timer sprinkling, automated chemical treatment of golf greens and fairways during timer sprinkling, commercial vegetable garden chemical treatment and many other beneficial chemical uses. Conventional beneficial chemical distribution methods often rely on a user or operator to be directly involved continuously during use of various existing devices in distribution of the beneficial chemicals.

The device of this invention can be connected to other ancillary dispersement equipment, such as portable or in-ground lawn or garden sprinklers, spargers, sprayers, nozzles or sprinkling systems, where the user may leave the equipment operating unattended to accomplish application of the beneficial chemicals. The user adds a chemical or chemicals to the device and initiates dispersement. At the end of the dispersement time, the user may stop chemical dispersement manually, or other ancillary equipment connected to this device, may stop chemical dispersement automatically. Alternately, the user can use this device manually connected to hoses with nozzles or other dispersing equipment similar to other existing chemical distributor devices. Accordingly, the device of this invention may be used manually, semi-automatically or automatically, depending upon the configuration of other connected ancillary dispersement equipment.

2. Description of the Prior Art

U.S. Pat. No. 3,351,290 to Baldwin depicts a lawn and shrub treatment system for spraying fertilizers and other chemicals utilizing a new or existing sprinkler system. A vertical, upright, portable container is described, preferably made of clear plastic, where the chemicals within may be observed during use of the device. The mixing tank is described as a portable container, supported on a ring-type stand, preferably screened from view behind shrubbery, connected by flexible hoses to a permanently mounted sprinkler system feed line in shunt with a throttling control valve and an output mixer valve, having a pair of output ports connecting to a garden hose bib and a sprinkler system feed line. The tank has an inlet nozzle connected to a rounded bottom, along with a bottom drain valve. The outlet nozzle of the tank is near the top side wall of the container and includes an integral, coarse internal filter screen within the nozzle. A large mouth screw-on lid on the top of the tank permits filling with chemicals and an anti-syphon valve is incorporated on the water supply connection.

U.S. Pat. No. 3,968,932 to Kimmell, describes an applicator for applying chemicals to the soil. The device operates as an agitated mixing tank for solid chemicals, using a pressurized source of water in a horizontal tank container to promote a uniform irrigation liquid product. The device is described for use in slip-stream application of solid chemicals into a main pressurized liquid supply header for agricultural irrigation in large farm fields employing standard irrigation line fittings. The device operates with a special internal main line admixing nozzle of frusto-conical shape used in conjunction with an internal main line ell producing a "ram effect", to facilitate mixing of solid chemicals with fresh supply water in a pressurized container. Internal sprays on a horizontal conduit in the container maintain dispersion of solids in a body of fresh supply liquid. The device is principally designed to operate with a slip-stream flow from the main water stream, in order for the main line admixing nozzle to work correctly.

U.S. Pat. No. 3,772,193 to Nelli et al., discloses a device for introducing a chemical into a liquid using a limitedly permeable barrier inside of a container, with a liquid supply nozzle and product outlet nozzle. The container is designated for dispersing sanitizing chemicals into swimming pool water from a low pressure water source at a preselected concentration by regulation of the water flow through the device.

In U.S. Pat. No. 4,026,673, Russo describes an apparatus for dissolving and dispensing fertilizer into water streams of different pressure. The device uses an atmospheric pressure container with a porous receptacle to introduce a preselected quantity of solid fertilizer into a water stream. The container sprinkles fresh water across a solid soluble fertilizer receptacle, where liquid gathers in a plenum float-controlled chamber supplying a pump and is further directed by valves to become one of two product liquid streams earmarked for different purposes. This device requires a pump to distribute dissolved fertilizer chemical into a pressurized water stream.

U.S. Pat. No. 4,250,910 to King, embodies an in-line apparatus for dissolving a solid chemical into a liquid flowing in a line. This patent suggests the use of a container utilizing an internal cartridge chemical holder with an adjustable internal return line, to expose variable quantities of soluble solid tablet chemical to a stream of fresh supply liquid, thus dissolving at variable rates, tablets of solid chemicals for swimming pool water chlorinator application. A unique lid allows easy access to the internal cartridge for solid tablet chemical filling. The device is principally designed to operate with a slip-stream flowing through it, off of a main water stream.

U.S. Pat. No. 4,250,911 to Kratz, portrays a chemical feeder using disposable chemical containers. The patent illustrates a vertical casing at atmospheric pressure, provided with a vertical weir and an associated disposable container for dissolving soluble solid chemicals into a metered water stream at low pressure. The patent describes dissolving tablet-shaped chlorine donor chemicals for swimming pool treatment, utilizing disposable chemical containers and producing reproducible chemical concentrations while allowing fine chemical concentration adjustments. The chemical container is designed for near atmospheric pressure, solid chemical dispersement applications.

In U.S. Pat. No. 4,333,493 to Beiswenger et al., a cartridge feeder for dissolving solid, soluble, granular fertilizer is described. This patent describes a pressurized plastic housing which holds a disposable plastic film inner container that is pre-filled with solid granular fertilizer and sealed. The disposable container has a built-in, fixed metering orifice and outlet apertures which operate in fluid communication with a venturi throat in the base of the main body of the device. The venturi is designed for low pressure loss of the water stream to a portable lawn or garden water sprinkler. The housing is further described as attached in series with lawn or garden hoses and is also attached to a sprinkler which rests on the ground. The dome of the device is described as removable, clear plastic for viewing fertilizer dissolving during operation. A threaded, removable dome cover employs a floating ball check vent for automatic liquid filling and draining of the disposable fertilizer cartridge.

In U.S. Pat. No. 4,555,347 to O'Dowd et al., an Iodine Disinfection Dispenser is described. The device passes a side stream of pressurized water flowing in a conduit around a fixed orifice in a main pressurized water stream, to treat a predetermined water flow rate with iodine crystals after pre-filtration. The apparatus disperses a disinfectant level of iodine crystals into fresh, potable water supplies and for other purposes described, and uses an inner perforated liquid distributor to separate the filter media from the iodine crystals. The preferred material of construction for the iodine and filter media container is PVC plastic and the container is pre-filled with iodine crystals and filter media, sealed and disposable upon exhaustion. The device is designed for side stream service and uses a fixed orifice in the main stream, thereby limiting the flow through the apparatus to dissolve solid chemicals.

U.S. Pat. No. 5,178,181 to Craig, refers to a fertilizer dispenser designed as a one-piece container with integrally formed inlet and outlet tubes in fluid communication with a main water stream fixed orifice, further attached to a sprinkler system. The device supplies a side stream of fresh water up-flow through an internal container filled with solid fertilizer in granules, powder, pellets or liquid fertilizer co-mixed with solid fertilizer or other specialty chemicals. The container may be fitted with an internal, water-permeable bag containing the described chemicals. The container has a lower drain plug to remove water prior to refilling and has a sealed chamber with a top-fill cap.

U.S. Pat. No. 5,303,729 to DeMarco, describes a chemical delivery device suited to supply lawn care chemicals to a sprinkler system or for pool chlorination. The container is arranged with a flow head fitted with a foil restriction device in the main water intake port, creating a syphon effect for flow of a side stream of fresh water through a mixing chamber separated from a chemical holding volume by a control plate with fixed metering apertures and syphon tubes. A control valve in the side stream returns effluent from the mixing chamber and provides regulation of chemical dispersement into the main water stream supplied to sprinklers or a swimming pool chlorination system.

It is an object of this invention to provide a device for dispersing a beneficial chemical or chemicals for treatment of living or growing vegetation, foliage, plants, trees, crops, shrubs, weeds, grass, fungi and insects on residential and commercial properties for beneficial purposes. The living or growing vegetation, foliage, plants, trees, crops, shrubs, weeds, grass, fungi and insects are described hereafter as "living or growing matter"; The term, "beneficial chemical or chemicals" herein includes solid, powder, granules, tablets or liquid chemical forms used in treatment of living or growing matter; and the term, "beneficial purposes" for dispersing these recited chemicals to living or growing matter, includes promoting growth or yield, (fertilization or nutrient feeding), insect control, (pesticide application), weed control, (herbicide application), bacteria control, (bactericide application), fungus control, (fungicide application), ornamental plant and shrub treatment, (chemicals applied to promote vegetation appearance and flowering abilities).

Another object of the invention is to provide a specially designed container (hereinafter called "the container") for receiving one or more beneficial chemicals, the container then being pressurized using water or another liquid chemical from a supply at a pressure greater than the container pressure. The container has an internal screen, wherein the beneficial chemical(s) becomes dissolved or admixed as liquid or as a liquid with solids commingled in the container. Screened product liquid may be withdrawn for a beneficial purpose hereto described. The container permits a fresh supply of a pressurizing liquid (water or other liquid chemical) to enter, while dissolved or admixed chemical or chemicals are withdrawn for a beneficial purpose. The beneficial chemical or chemicals are passed through the screen and withdrawn at a product outlet pipe connection or hose connection from the container and dispersed for the purpose of treatment of living or growing matter by attachment to "other installed in-ground pipes further attached to spraying nozzles, sprinklers or sprinkler systems or by attachment to flexible loose hoses or rigid pipe lying on the ground further attached to sprayer devices such as hand-held nozzles, sprinklers, sprayers or spargers", collectively hereafter referred to as "other ancillary dispersement equipment".

Yet another object of this invention is to provide a chemical dispersing apparatus having one or more internal, cylindrical screens, wherein a beneficial chemical or chemicals of solid, powder, granules, tablets or liquid forms are placed within the container outside of the screen or screens, through a valve or nozzle, which may then be closed or blinded. A pressurizing fresh source liquid water or other liquid chemical, hereafter referred to as "fresh source liquid", is allowed to flow into the container, permitting contact and exposure with the beneficial chemical(s) contained therein. The pressure within the container increases until it equalizes with the pressure of the fresh source liquid, as the container is designed to withstand the full available pressure of the fresh source liquid without rupture or leakage. The beneficial chemical(s) content in the container once pressurized, may thus be held under pressure without leakage or loss prior to dispersing and may be selectively dispensed through the screen or screens, from the container.

Still another object of the invention is to provide a chemical dispensing apparatus for dispensing beneficial chemical or chemicals, which beneficial chemical(s) are typically solid, powder, granule or tablet forms, and are placed within the container through a valve or nozzle, which may then be closed or blinded. The solid, powder, granule or tablet forms of the beneficial chemical or chemicals are referred hereafter as "solid chemical(s)". The container is designed to prevent the escape or loss of solid chemical(s) during the dispersement process, except for solid chemical (s) fully reacted, dissolved or admixed with fresh source liquid. Solid chemical or chemicals are gradually dissolved or admixed in the container from the inflow of fresh source liquid, creating a source of dissolved, pressurized beneficial chemical(s) product for dispersing from the container. The container is fitted with one or more cylindrical screens designed to obstruct the escape of solid chemical(s) into the beneficial product liquid stream flowing from the container, unless the chemical or chemicals are fully dissolved in the fresh source liquid, or admixed as very fine particulate which will pass through the screen(s) from the container.

A still further object of this invention is to provide a new and improved chemical dispersing apparatus for dispersing a chemical or chemicals of liquid form placed or poured into a container through a valve or nozzle, which may then be closed or blinded. The liquid form of beneficial chemical or chemicals is referred hereafter as "liquid chemical(s)". The container permits displacement of liquid chemical(s) during operation until all such liquid chemical(s) fully react or co-mix with fresh source liquid, thus becoming a blended fluid of gradually decreasing chemical concentration as a beneficial liquid chemical product. The inflow of fresh source liquid creates a continuous supply of pressurized beneficial liquid chemical product from a cylindrical screen within the container. The beneficial liquid chemical or chemicals are dispersed for treatment of living or growing matter for a beneficial purpose previously described. Dispersing occurs by withdrawal of beneficial chemical(s) from a product mixture pipe connection or hose connection attached to the container passing the beneficial chemical(s) through other ancillary dispersement equipment and applying the resultant stream of pressurized chemical(s) to treatment of living or growing matter for a beneficial purpose previously described.

SUMMARY OF THE INVENTION

These and other objects of the invention are provided in a new and improved chemical dispersing apparatus characterized by a container having an internal cylindrical screen or screens, sealed at the top and bottom of the container, for receiving liquid or solid chemical or chemicals placed within the container outside of the screen(s) through a valve or nozzle. The container may then be closed or blinded. After the container is pressurized with a fresh source liquid such as water, the beneficial chemical(s) may be dispersed by withdrawal through the screen(s) and into a product outlet hose or pipe connection attached to the container, passing variable quantities and concentrations of the chemical(s) at rapid or slow dispersement into other ancillary dispersement equipment and applying the resultant stream of pressurized beneficial chemical(s) to treatment of living or growing matter for a beneficial purpose previously described.

BRIEF DESCRIPTION OF THE DRAWINGS

FIG. 1A is a side view, partially in section, of an alternative container design;

FIG. 1B is a side view of a preferred screen configuration;

FIG. 1C is an enlarged sectional view of the top segment of the screen illustrated in FIG. 1B;

FIG. 1D is a bottom end view of the screen illustrated in FIG. 1B;

FIG. 1E is a side view, partially in section, of a dual screen container; and

DESCRIPTION OF THE PREFERRED EMBODIMENTS

Figure 1:
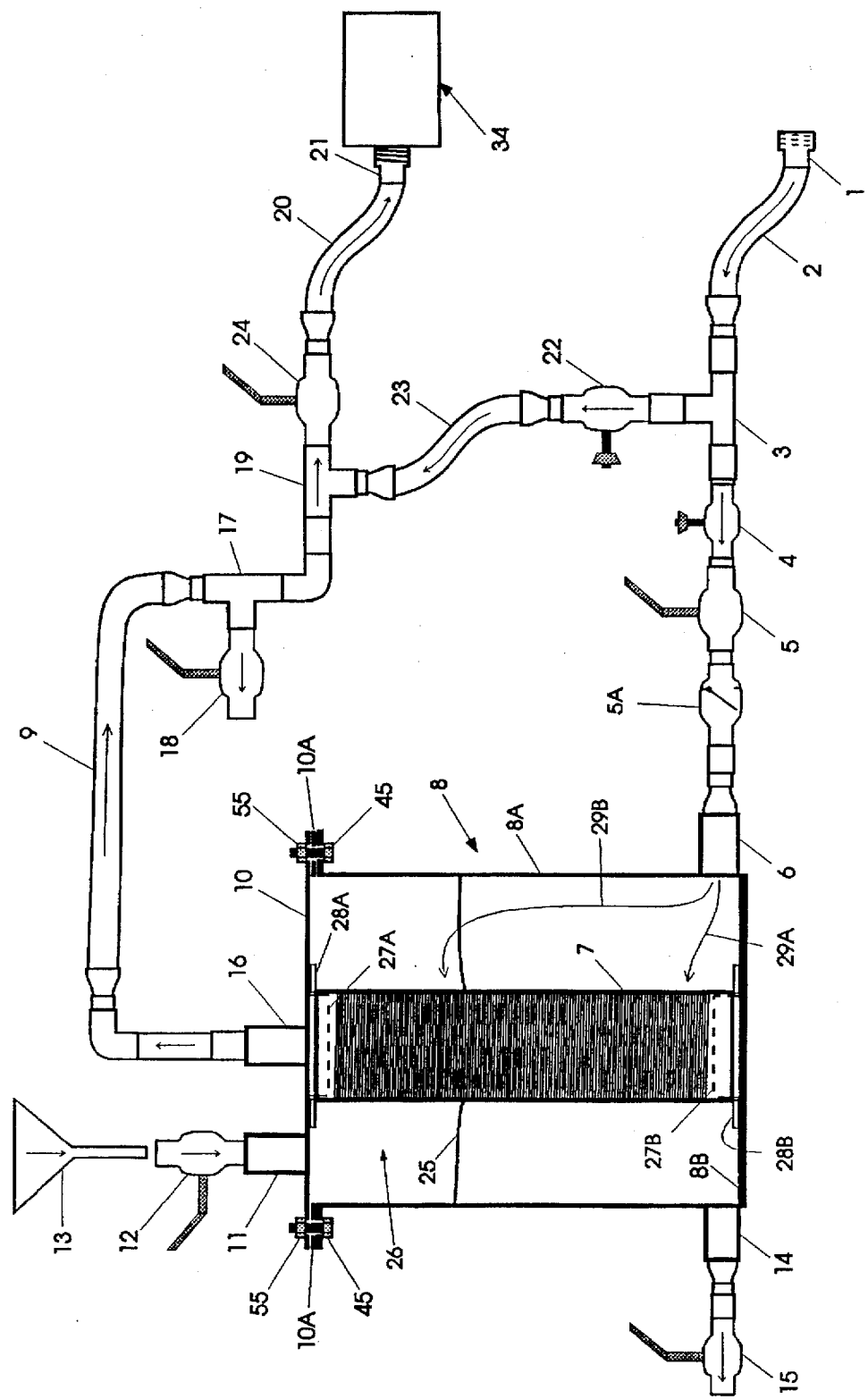
FIG. 1 is a side view, partially in section, of a preferred design of the chemical dispersing apparatus of this invention.

Referring to FIG. 1 of the drawings, the container 8 is exhibited with a collection of specific hardware components arranged for the purpose of dispersing previously mentioned beneficial chemical or chemicals for treatment of living or growing matter for a beneficial purpose previously described. A cylindrical screen 7 is seated in the container 8 and inlet valve 12, connected to nozzle 11, may be opened to allow pour-in funnel 13 to be inserted to fill liquid or solid beneficial chemical or chemicals 25 into vessel 8A outside of the screen 7. Alternately, as shown in FIG. 1A, an integral nozzle 11A may be fitted with a bolted cover 12A, having an elastomer gasket 12B, attached with nuts 55 and bolts 45, as another means of filling container 8. Vessel 8A is an upright, vertical cylinder fabricated from metal or thermal plastic materials and having a vessel bottom 8B, with capacities ranging from less than 1 gallon to 1000 gallons of chemical retention, depending on user requirements. Outlet product vent valve 18 should be opened to allow for displacement of air or vapors as beneficial chemical or chemicals 25 are added to vessel 8A. An appropriate quantity of chemical can be added by the user of the invention for proper treatment of living or growing matter, according to the beneficial purpose intended. Upon completion of introduction of beneficial chemical or chemicals 25 into vessel 8A, inlet valve 12, (or bolted cover 12A), and outlet product vent valve 18 should be closed, to seal the container. Globe valve 4, bypass valve 22 and product mixture outlet valve 24 should also be closed. Fresh source liquid supply line 2 may be connected to a pressurized source of water or liquid chemical (not illustrated) at threaded connector 1. A useful pressurized fresh source liquid supply would be a municipal water line with a shut-off valve (not illustrated) attached at threaded connector 1. Other liquid chemicals can be used as the fresh source liquid by attachment of threaded connector 1 to a supply tank (not illustrated) and an associated chemical pump (not illustrated) with appropriate discharge piping (not illustrated) and a shut-off valve (not illustrated) via appropriate hose or pipe adapters (not illustrated).

Pressurized fresh source liquid supply may flow through threaded connector 1 and fresh source liquid supply line 2 by opening a valve (previously described and not illustrated) upstream of connector i after proper tightening of threaded connector 1. Globe valve 4 and intake valve 5 may then be opened and vessel 8A begins to fill with pressurized fresh source liquid passing through globe valve 4, intake valve 5, check valve 5A, and fresh source inlet nozzle 6, as indicated by radial flow path 29A and axial-radial flow path 29B in FIG. 1. When the pressure inside vessel 8A equilibrates with the pressure of fresh source liquid through threaded connector 1, flow will cease. Vessel 8A will be partially filled with fresh source liquid and beneficial chemical or chemicals previously introduced to vessel 8A and the enclosed air or vapors 26 will be compressed. Bolted cover plate 10, with elastomer gasket 10A, seals vessel 8A and prevents loss of pressure. A pressurized supply of beneficial chemicals is now available for dispersement through the screen 7, into the product mixture outlet nozzle 16, mounted on cover plate 10. If desired, outlet product vent valve 18 may be partially opened to allow compressed vapors 26 to displace. When liquid begins to escape, outlet product vent valve 18 should be closed.

Pressure and beneficial chemical or chemicals are blocked from product mixture outlet line 20 by closing product mixture outlet valve 24. When dispersement of beneficial chemical or chemicals is desired, the product mixture outlet line 20 may be connected by means of threaded connector 21, to any existing installed in-ground pipes (not illustrated) attached to spraying nozzles, sprinklers and sprinkler systems (not illustrated) or with flexible loose hoses or rigid pipe (not illustrated) lying on the ground and connected to sprayer devices such as hand-held nozzles, sprayers, spargers or sprinklers (not illustrated). With the appropriate other ancillary dispersement equipment (not illustrated) so connected to threaded connector 21 and appropriately directed toward living or growing matter requiring beneficial chemical treatment, product mixture outlet valve 24 may be opened.

Upon opening product mixture outlet valve 24, a continuous pressurized flow of fresh source liquid will enter through fresh source liquid supply line 2, inlet fluid bypass tee 3, globe valve 4, intake valve 5, and check valve 5A, into fresh source inlet nozzle 6, into vessel 8A and through screen 7. Furthermore, the fresh source liquid will contact the beneficial chemicals within vessel 8A outside of screen 7, in a radial and up-flow axial-radial flow pattern and partially dissolve the solid chemical(s) or co-mix with the liquid chemical(s). Inlet flow to vessel 8A creates a displacement flow through cylindrical screen 7 and product mixture outlet nozzle 16 and a stream of product liquid flows through product outlet line 9 into product outlet tee 17, bypassing outlet product vent valve 18, which is normally closed. Flow through bypass line 23 via bypass valve 22 may be prohibited with bypass valve 22 closed. During this arrangement and operation, a pressurized flow of product mixture flows through product mixture outlet tee 19 and product mixture outlet valve 24 and exits the product mixture outlet line 20 and threaded connector 21 as a concentrate of beneficial chemical(s) to the previously mentioned other ancillary dispersement equipment, hereinafter defined and represented by reference numeral 34 in the drawing, which ancillary dispersement equipment may be connected to threaded connector 21 and this chemical or chemicals may be applied to living or growing matter for a beneficial purpose previously described.

By a continuing flow through the container 8 and screen 7 in the manner described, a pressurized source of beneficial chemical(s) will continue to be dispersed to living or growing matter in a gradually decreasing concentration, until complete displacement of the co-mixed chemical or chemicals occurs or until solid chemical or chemicals have been completely dissolved, admixed and displaced. The time for displacement of all beneficial chemical or chemicals from vessel 8A, while operating the manner previously described, depends on the properties of the beneficial chemical(s) and upon the flow rate of fresh source liquid entering through fresh source inlet nozzle 6, the quantity of beneficial chemical(s) 25 placed in the vessel 8A of the container 8, and the temperature of the fresh source liquid.

Referring to FIGS. 1B, 1C and 1D, in a preferred embodiment screen 7 is a special design, preventing solid chemicals from escaping vessel 8A as admixed solids in liquid, unless the particle size is smaller than the screen slots 42 in the screen 7 will allow. Screen 7 is designed to prohibit solid chemicals from appreciably exiting vessel 8A through product mixture outlet nozzle 16 in substantial quantity or particle size that would restrict continuous flow through the container 8 or other ancillary dispersement equipment 34 attached to threaded connector 21. Furthermore, screen 7 is selected to completely resist plugging by any solid particles. Accordingly, the presence and design of screen 7 is important to the proper operation of the container 8 and the screen 7 may be fabricated according to the disclosures of one or more of U.S. Pat. Nos. 899,054, 1,800,642 and 1,913,760, and may be manufactured of metal or thermal plastic as a single piece construction.

Screen 7 is selected such that it will not allow any particles larger than a specific size to pass inside to product mixture outlet nozzle 16. As illustrated in FIG. 1, screen 7 fits over a sleeve 27B, which is attached to the vessel bottom 8B of the container 8, and rests on elastomer gasket 28B, providing a bottom end seal. Attached to cover plate 10, sleeve 27A fits inside the top of screen 7, with elastomer gasket 28A sealing the top end of screen 7 when cover plate 10 is secured with bolts 45 and nuts 55.

Referring to FIG. 1E, multiple screens 7 may be installed in vessel 8A in the same manner as illustrated in FIG. 1, with multiple product mixture outlet nozzles 16 combined into a common outlet header 49, further attached to product outlet line 9, which may be attached to connecting pipe, hoses and adapters (not illustrated). Separate top vessel sealing flanges 46 may be secured with threaded studs 47, nuts 55, and elastomer gaskets 48, thus sealing cover plate 10 and the top of screens 7 for single or multiple screens 7 installed in vessel 8A, as an alternate operating arrangement.

A preferred configuration of screen 7 is more particularly illustrated in FIGS. 1B, 1C and 1D. Screen 7 is built in a single-piece, cylindrical configuration, of metal or thermal plastic material. Screen 7 is made of vertical rods 43, helically wrapped with V-shaped profile wire 41. The continuous slots 42 thus formed, permit only two-point contact of particles entering the slots 42, thus preventing plugging. Referring to FIG. 1B, screen 7 is illustrated as a vertical cylinder in elevational view. Focused view 40 shown in FIG. 1B is illustrated as a vertical sectional enlargement of the top of screen 7, shown as FIG. 1C. End view 30—30 shown in FIG. 1B is illustrated further as FIG. 1D. Referring now to FIG. 1C, in the vertical sectional enlarged view of screen 7, the cylindrical top of the screen 7 is shown as reference numeral 44. The cylinder top 44 of the screen 7 slips over sleeve 27A, further attached to cover plate 10, as shown in FIG. 1. The cylindrical side wall of screen 7 is defined by the V-shaped profile wire 41, separated uniformly by slots 42, evenly spaced down the screen 7. A preferred embodiment of this invention specifies that slot 42 be spaced in the range from 0.006–0.020 inch optimum width. Inside the cylinder defined by screen 7, the vertical rods 43 are welded to the inner V-shaped profile wire 41 at points 44a, along the full length of contact, to stiffen and strengthen screen 7. FIG. 1D is a bottom end view of screen 7, more particularly showing vertical rods 43 and helical V-shaped profile wire 41, illustrating the outside screen 7 surface.

Referring again to FIG. 1, in another embodiment of the invention, fresh source liquid bypass valve 22 may be partially or fully opened while displacement of beneficial chemical(s) 25 from vessel 8A is in progress. In so utilizing bypass valve 22, the concentration of beneficial chemical(s) 25 passing through product mixture outlet valve 24 will decrease due to fresh source liquid dilution, and the time frame for complete displacement of beneficial chemical(s) 25 from within vessel 8A will increase, due to reduced flow through fresh source inlet nozzle 6. For certain strong beneficial chemical or chemicals, dilution prior to dispersement by operating the container 8 in this manner is preferred.

In still another embodiment of the invention, globe valve 4 may be partially closed to restrict the flow of fresh source liquid into vessel 8A. During this operation, bypass valve 22 is operated fully open. This mode allows further reduction in product mixture outlet concentration at product mixture outlet tee 19 when it is desired to disperse very strong beneficial chemical(s) as a very dilute outlet product through product mixture outlet line 20 and threaded connector 21 over a long period of time. In practical use of this mode of operation, if globe valve 4 is fully closed with bypass valve 22 fully open, the product mixture outlet line 20 is in "rinse service". No beneficial chemical or chemicals will then be displaced from vessel 8A through product mixture outlet nozzle 16, into product outlet line 9. The principle purpose of this manner of operation is to clear all beneficial chemical (s) 25 from other ancillary dispersement equipment 34 connected to threaded connector 21, thus preventing potential harmful effects, such as corrosion from prolonged chemical exposure to other ancillary dispersement equipment In yet another embodiment of the invention, bolted cover plate 10 may be opened for cleaning undissolved beneficial chemical(s) 25 from vessel 8A, or for addition of a large quantity of beneficial chemical or chemicals 25, prior to dispersement. Cleaning the vessel 8A of the container 8 may be accomplished by closing intake valve 5, bypass valve 22 and product mixture outlet valve 24, then opening outlet product vent valve 18, to de-pressure vessel 8A. Upon de-pressuring, vessel 8A may be opened by removing bolted cover plate 10. Alternately, vessel 8A may be drained of trace residual liquid chemical(s) by opening drain valve 15, connected to drain nozzle 14, while inlet valve 12 or outlet product vent valve 18 is open, to allow air displacement during liquid drainage.

In still another embodiment of the invention, undissolved beneficial chemical(s) 25 may be displaced from vessel 8A as illustrated in FIG. 1E. One or more cleaning valves 50 may be connected to a pressurized source of water, typically by hoses or pipe headers (not illustrated). Cleaning valve(s) 50 are connected to nozzle(s) 51, further connected to internal spray nozzle(s) 52. One or more drain valves 15 may be opened and cleaning valves 50 are then opened, allowing water spray to displace insoluble chemical(s) through drain valve(s) 15. When the liquid effluent from drain valve(s) 15 is free of suspended solid chemical(s), cleaning valve(s) 50 may be closed. Fresh source inlet nozzle 6 is not shown in FIG. 1E in order to illustrate multiple drain nozzles. It exists in a rotated position on vessel 8A, near the bottom 8B, similar to drain nozzle 14. The spray nozzle cleaning arrangement described may not be used in all such vessels, but the spray nozzle(s) 52 are provided to eliminate the need to remove cover plate 10 on large vessels, allowing clearing of gradual buildup of insoluble chemicals. Smaller vessels may not necessarily include this system because of the high cost involved.

Figure 1F:
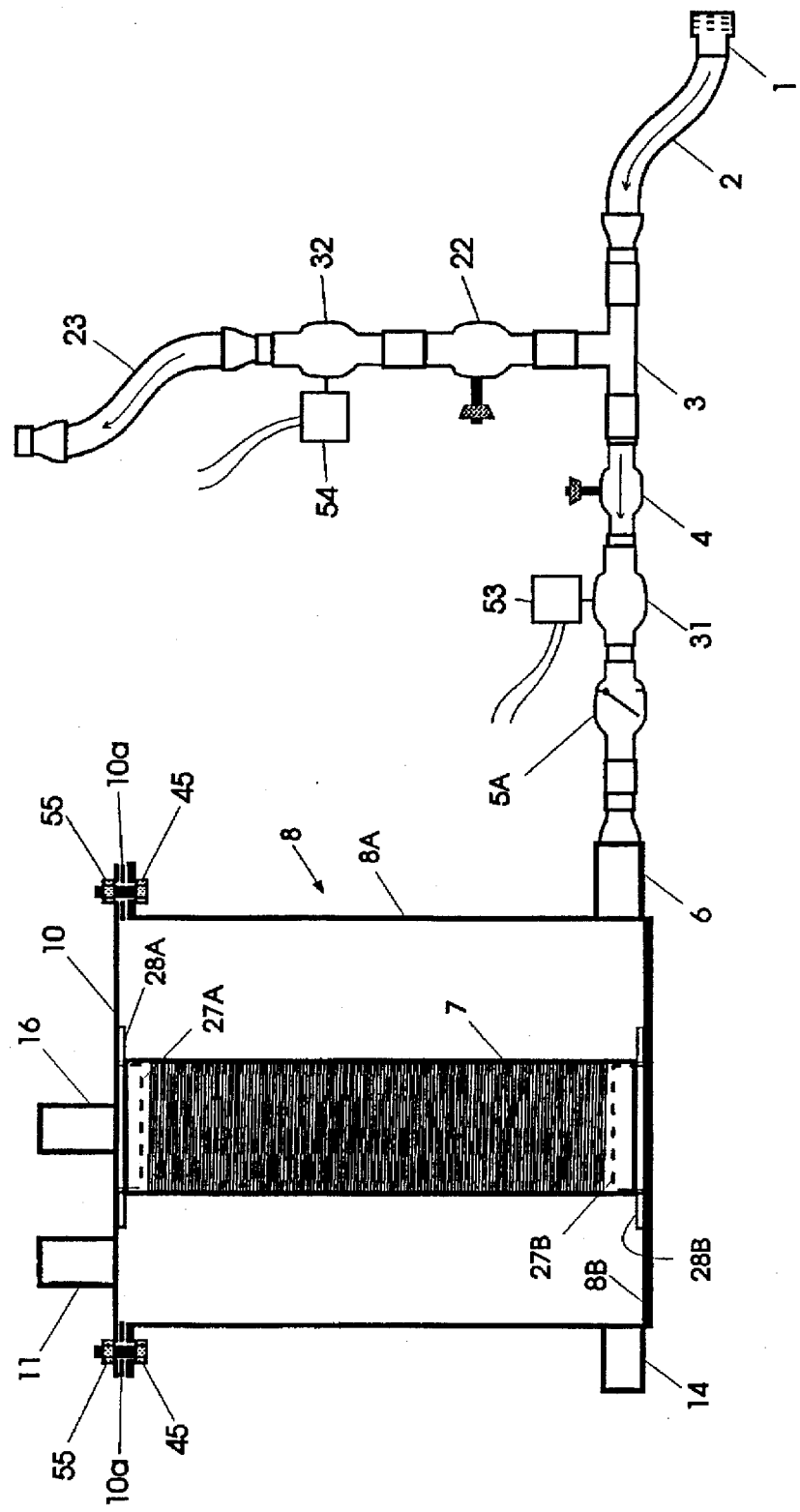
FIG. 1F is a side view, partially in section, of the container and some of the piping illustrated in FIG. 1, with alternative valving.

Referring now to FIG. 1F, in another embodiment of the invention, fresh source liquid automated on/off valve 31 and bypass liquid automated on/off valve 32 may be fitted with electric solenoid devices 53 and 54, respectively, integrated with other ancillary dispersement equipment (not illustrated). Specifically, the vessel 8A of the container 8 may be connected to ancillary connected equipment 34, such as an installed automatic sprinkler system (not illustrated) with timers (not illustrated) and/or instrument controls (not illustrated) for dispersing water over areas of land for watering vegetation including lawns, trees, shrubbery, flower beds, golf course fairways and greens, and private and commercial crop gardens, in non-exclusive particular. Utilizing the vessel 8A connected to an automatic sprinkler system as ancillary dispersement equipment 34, permits the user to disperse beneficial chemicals to regions of landscaped property according to the physical arrangement of a sprinkler system and watering cycle. The settings of globe valve 4 and bypass valve 22, and the quantity of beneficial chemical to be so applied to a region of a landscape is controlled by the user. Timers (not illustrated) on the sprinkler system permit dispersement of beneficial chemical(s) over one or more watering cycles to various regions of landscape in an automatic manner, consistent with the design of the instrument controls (not illustrated) in the automatic sprinkler system (not illustrated).

Experimental Testing

Operation of the chemical dispersing apparatus of this invention according to the procedures outlined above with respect to FIGS. 1–1F of the drawings, is illustrated by the following examples and accompanying graphs.

EXAMPLE I

Figure 2:
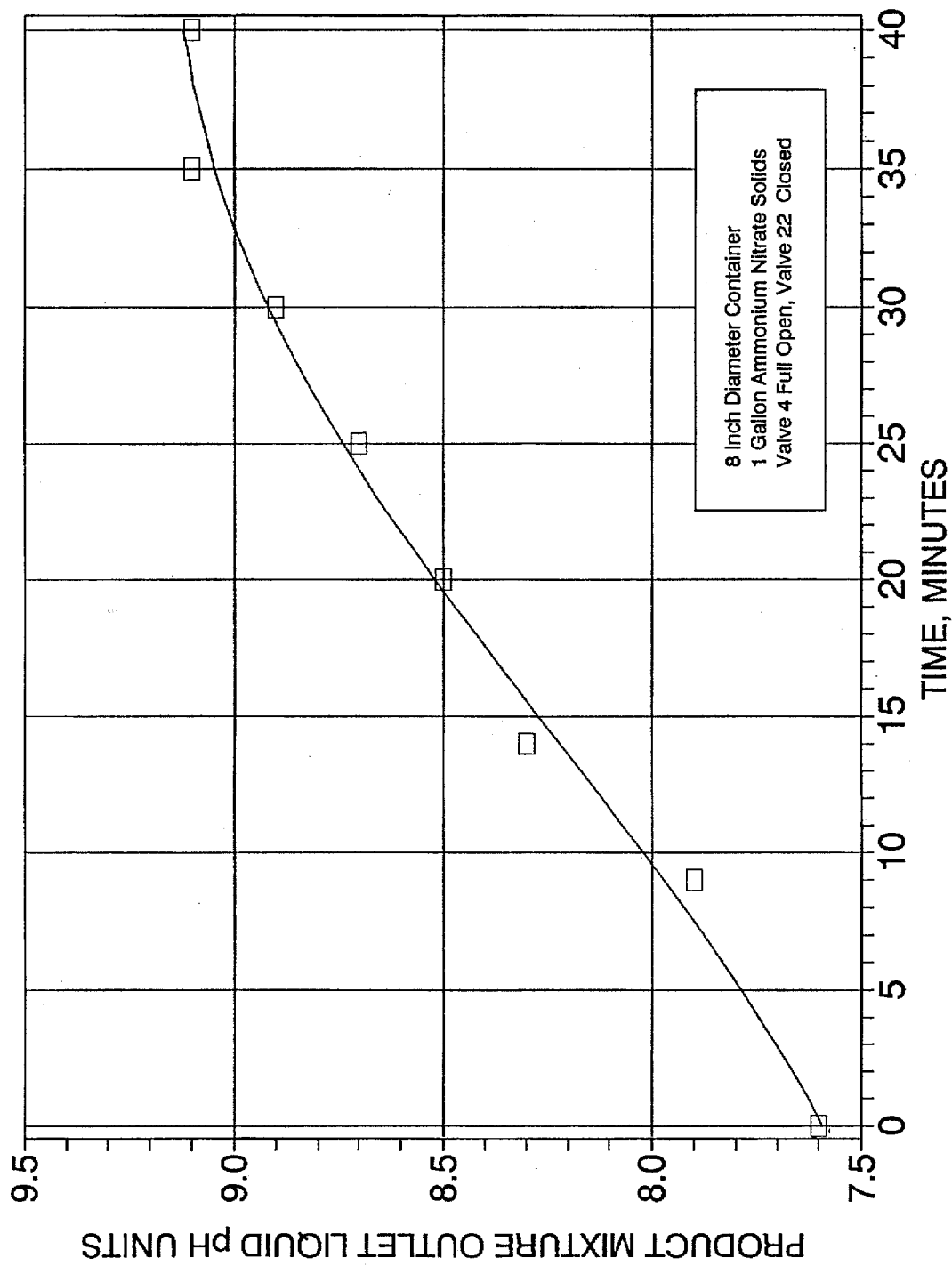
FIGS. 2–4 are graphs representing experimental data accumulated during operation of an 8 inch diameter version of the container filled with specific chemicals.

Referring to FIG. 2 of the drawings, an 8 inch diameter by 12 inch high, 2.6 gallon version of the container 8 hereto described and illustrated in FIG. 1, was used to disperse solid, commercial grade, granular ammonium nitrate fertilizer on a residential lawn as a nutrient. The ancillary dispersement equipment 34 was a ¾ inch diameter rubber garden hose attached at the threaded connector 21, described previously, which was further attached to a portable impulse lawn sprinkler (not illustrated) that rests on the lawn. The lawn sprinkler was set up to cover an area of 25 foot radius. The fresh source liquid used in the demonstration was a potable water source connected by a ¾ inch diameter garden hose to the threaded connector 1 and further connected to an outside faucet with attached programmable timer (not illustrated), set for a 40 minute operational sequence.

During dispersement, a concentration of the beneficial chemical in the product liquid was measured by a battery-operated, portable pH probe (not illustrated) with digital liquid crystal display, from samples withdrawn at the outlet product vent valve 18. The portable pH probe was capable of reading pH and temperature of liquid samples and the pH reading of dissolved mixtures made from various chemicals blended together were employed as a simple method of resolving the concentration effects of adding one chemical to another. Before addition of beneficial chemical occured, the background pH of the fresh source water was measured. During this trial it was observed to be 9.1.

Referring now to FIG. 1 of the drawing, in preparation for dispersement, one gallon of solid granular ammonium nitrate fertilizer was added to the container 8, which was then filled and pressurized with potable water. In this demonstration, the purpose was to rapidly disperse all of the beneficial chemical over a watering cycle of about 30–40 minutes. Globe valve 4 was a ⅜ inch globe valve, which was fully open, while bypass valve 22 was closed. The container 8 was operated in full-flow mode without any bypass to dilute the product outlet liquid. Product mixture outlet valve 24 was opened and dispersement began at time zero, as recorded in FIG. 2. An initial sample was taken from outlet product vent valve 18, and the pH and temperature were recorded. Referring again to FIG. 2, the initial pH of 7.6 illustrates that the fertilizer chemical has reduced the pH of the potable water as dissolving has taken place within the container 8.

The initial product outlet sample temperature was observed to be 84 degrees Fahrenheit, and was not further recorded during the experiment. Over a time frame of 40 minutes, the pH of samples from outlet product vent valve 18 were measured and recorded and FIG. 2 indicates these sampled results. At the end of 40 minutes, the samples at outlet product vent valve 18 stabilized at a pH of 9.1. All of the beneficial chemical added to the container 8 was dispersed on the lawn during this period. Additional watering after 40 minutes was limited to application of water only to the lawn, since no measurable quantities of beneficial chemicals were then dispersed from the container 8.

EXAMPLE II

Figure 3:
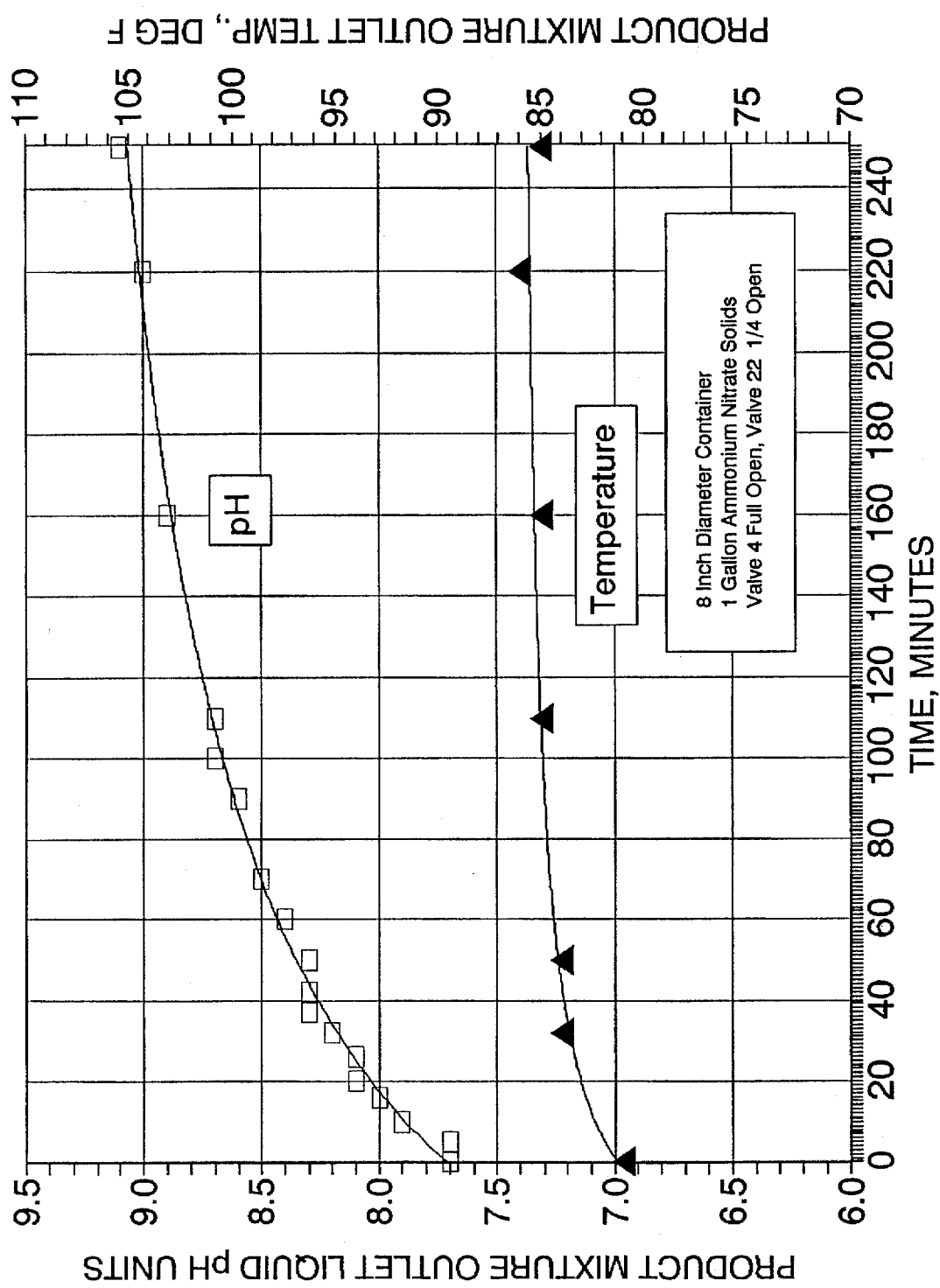

Referring to FIG. 3 of the drawings, the same 8 inch diameter container 8 described in Example 1 was filled with one gallon of solid granular ammonium nitrate fertilizer and then pressurized with potable water. The potable water supply was sampled and tested for pH, which was found to be 9.1. Referring to FIG. 1, the purpose of so operating the container 8 in this manner was to allow dispersement of beneficial chemical at lower concentration, or to allow greater dispersement time of a given quantity of beneficial chemical. This mode of operating the container 8 allowed switching or moving the ancillary dispersement equipment 34 during beneficial chemical treatment to spread the chemicals over other landscape regions. At the start of the experiment, globe valve 4 was fully opened and bypass valve 22 was 25 percent opened. Globe valve 4 was a ⅜ inch globe valve and bypass valve 22 was a ¾ inch globe valve. The ancillary dispersement equipment 34 was connected as previously described and illustrated before in FIG. 1. Product mixture outlet valve 24 was opened, thus starting chemical dispersement. An initial product outlet sample was collected from outlet product vent valve 18 and the product pH and temperature were recorded. The initial product outlet sample pH was 7.7, as recorded in FIG. 3. Product samples were withdrawn from outlet product vent valve 18 over time and the pH and temperature recorded in FIG. 3, as previously described. After 250 minutes elapsed, dispersement was manually stopped. The pH of the product outlet sample was restored to 9.1, confirming that all beneficial chemical has been dispersed from the container 8 onto the lawn through the attached ancillary dispersement equipment 34. The temperature of the product liquid increased from 81 to 85 degrees Fahrenheit and stabilized over the 250 minute time period.

By operating the container 8 in the manner evidenced by the graph in FIG. 3, the quantity of fresh source liquid required to fully disperse a fixed quantity of beneficial chemical increased 6 times compared to the experiment recorded in FIG. 2. The product outlet concentration of beneficial chemical dispersed through ancillary dispersement equipment 34 attached to threaded connector 21 during the test recorded in FIG. 3 was reduced to one-sixth the concentration compared with the previous trial described in the data illustrated in FIG. 2.

EXAMPLE III

Figure 4:
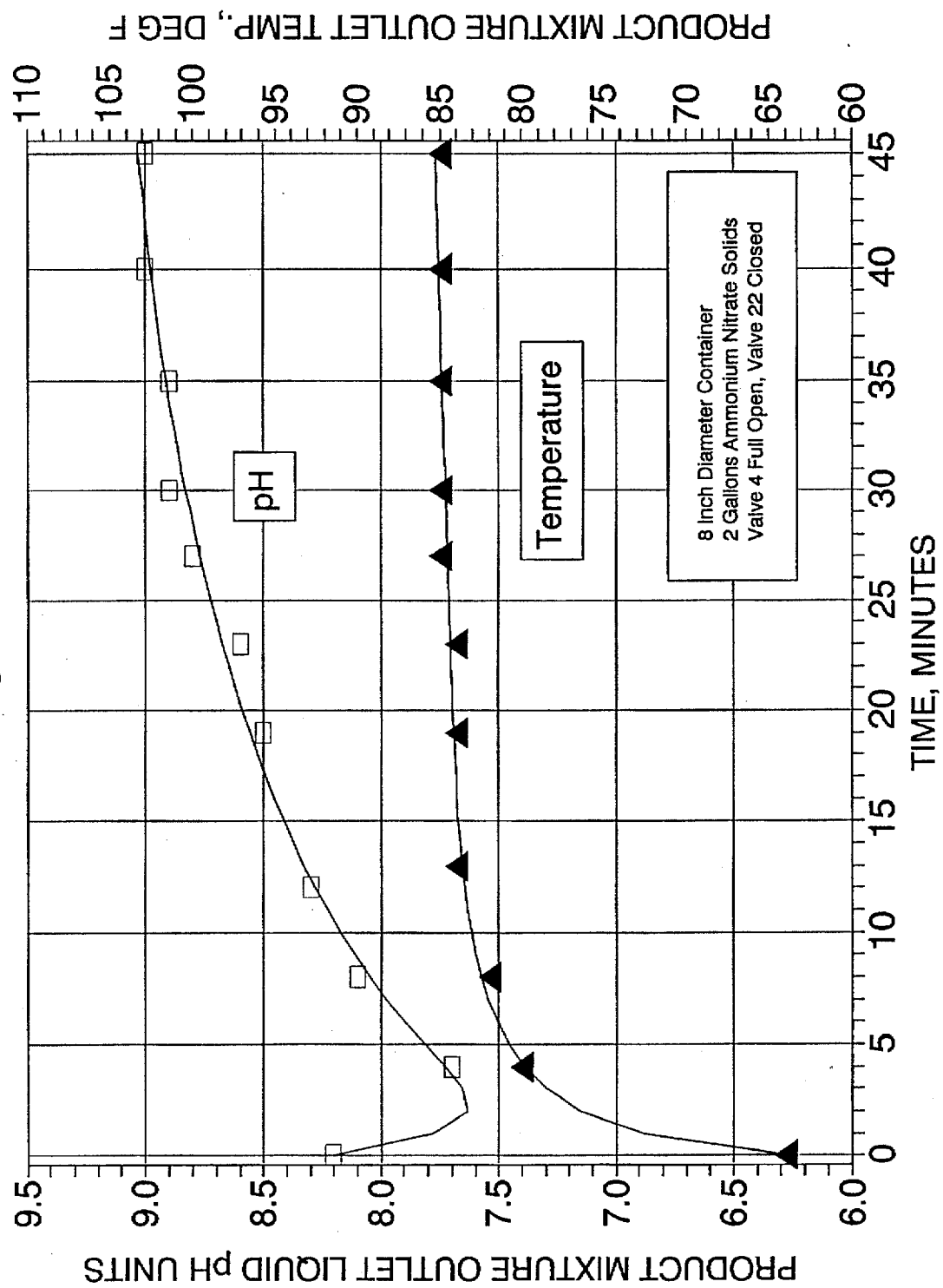

Referring to FIG. 4 of the drawings, the same 8 inch diameter container 8 described previously with regard to FIGS. 2–3 was filled with two gallons of solid, granular ammonium nitrate fertilizer and then pressurized with potable water. The valve settings for the container 8 were the same as previously referred to the text related to FIG. 2. That is, the trial was conducted identically as described in the text related to FIG. 2, except that the quantity of ammonium nitrate solids placed in the container was two gallons, rather than one gallon. Referring to FIG. 1, prior to filling the container 8 with chemical, a sample of fresh source potable water was sampled from the hose connected to threaded connector 1. The potable water source was tested for pH and temperature and the pH was 9.1 and the temperature was 85 degrees Fahrenheit. The container 8 was then filled with two gallons of pure ammonium nitrate solids. Upon pressurizing the container 8 with fresh source potable water, product mixture outlet valve 24 was opened to initiate flow to the garden hose and sprinkler ancillary dispersion equipment 34 previously described. At the start of the experiment, a product sample was taken from outlet product vent valve 18 and the product liquid pH and temperature were recorded. Referring to FIG. 4, the initial product outlet pH was 8.2 and the temperature was 64 degrees Fahrenheit. The greater quantity of ammonium nitrate chemical added to the container and resultant reduced capacity for fresh source potable water resulted in the cooling effect, due to the heat of solution of ammonium nitrate chemical in water.

The product outlet samples taken at outlet product vent valve 18 were measured and recorded for pH and temperature, over time. As FIG. 4 indicates, the outlet product liquid temperature from container 8 was initially below the temperature of the fresh source supply potable water. As fresh source supply water dispersed the initial liquid content in the container 8, the product outlet temperature rose. Further, ammonium nitrate solids dissolved in fresh liquid and the pH of the product outlet liquid fell until a saturated concentration was reached. Thereafter, the concentration of beneficial chemical slowly fell, as indicated by rising pH measurement, as in previous experiments. After 45 minutes, the experiment was stopped, when the product outlet pH matched the value of the fresh supply potable water value of 9.1. FIGS. 2 and 4 show that the specialized container 8 will disperse differing quantities of a specific beneficial chemical in approximately the same period of time. Ammonium nitrate and certain other solid and liquid chemicals which are readily soluble or miscible in small quantities of liquids exhibit this characteristic.

EXAMPLE IV

Figure 5:
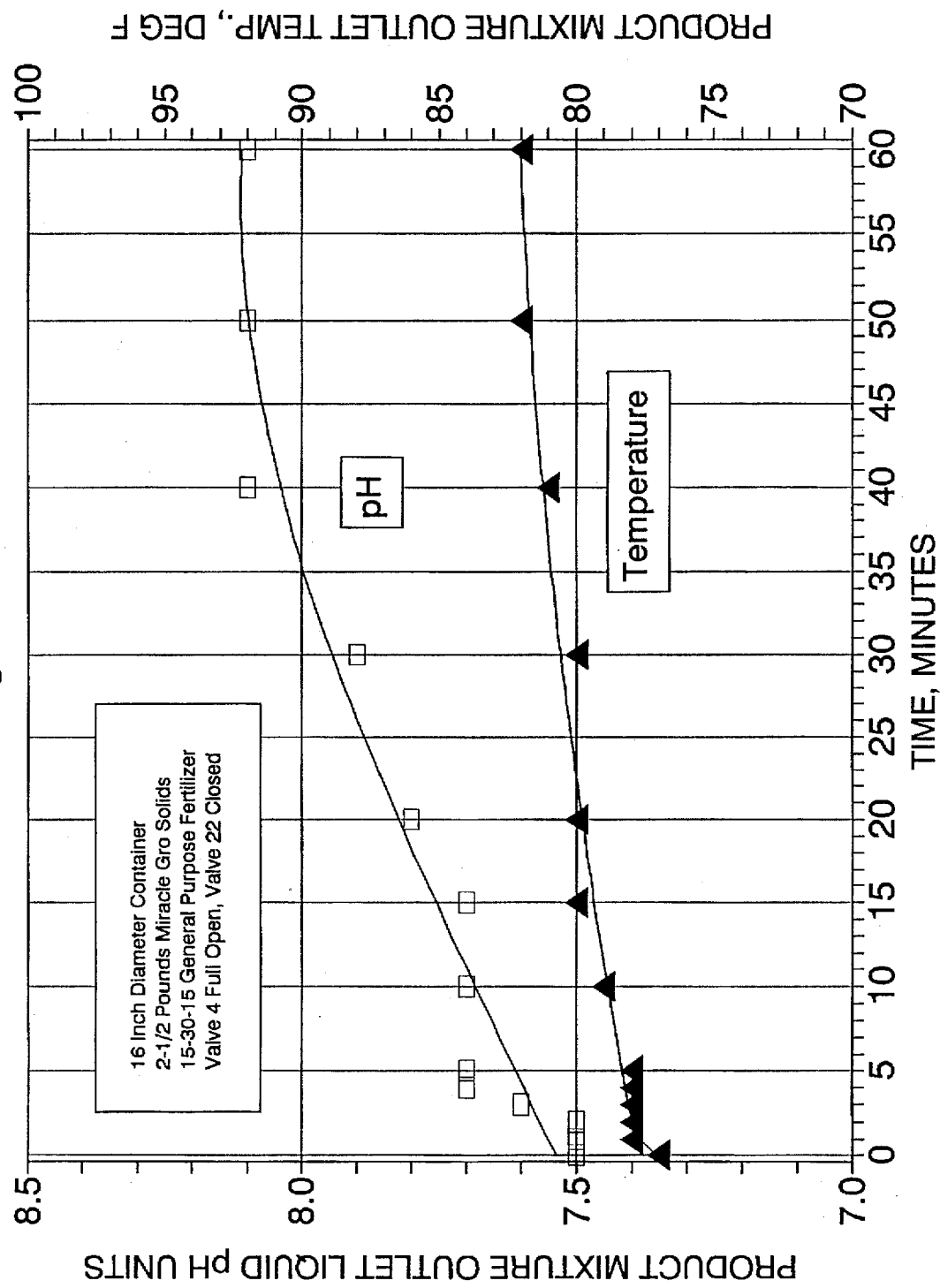
FIG. 5 is a graph representing experimental data accumulated operating a 16 inch diameter version of the container filled with a specific chemical.

Referring to FIG. 5 of the drawings, a 16 inch diameter by 12 inch height, 10.4 gallon version of the container 8 was used to disperse 15-30-15 "Miracle Gro", general purpose fertilizer solids on residential shrubbery as a nutrient. The ancillary dispersement equipment 34 included a ¾ inch diameter rubber garden hose attached at threaded connector 21, which was further attached to a hand-held spray nozzle. The fresh source liquid used in the trial was potable water connected by a ¾ inch diameter garden hose (not illustrated) to threaded connector 1, further connected to a manually-operated outside faucet (not illustrated). Before any addition of beneficial chemical, the pH of the fresh source potable water was measured and found to be 8.1.

At the start of the experiment, 2½ pounds of "Miracle Gro 15-30-15", general purpose fertilizer solids were added to the container 8, which was filled and pressurized with potable water. In this trial, the purpose was to slowly disperse all of the beneficial chemical over a watering cycle of 60 minutes. Globe valve 4 was a ¼ inch globe valve, which was fully opened. Bypass valve 22 was a ¾ inch globe valve, which was closed. The container 8 was operated in full flow mode without any bypass, to dilute the product outlet liquid. Product mixture outlet valve 24 was opened and dispersement began at time zero, as recorded in FIG. 5. An initial sample was taken from outlet product vent valve 18 and the pH and temperature were recorded. The initial pH of 7.5 illustrates that the solid crystalline fertilizer chemical reduced the pH of the potable water as dissolving took place within the container 8. The initial product outlet sample temperature was 77 degrees Fahrenheit. Over a period of 60 minutes, the pH and temperature of samples from outlet product vent valve 18 were measured and recorded and FIG. 5 indicates these results. At the end of 60 minutes, the samples at outlet product vent valve 18 were stabilized at a pH of 8.1. All of the beneficial chemical added to the container 8 was dispersed onto the shrubbery during this period.

EXAMPLE V

Figure 6:
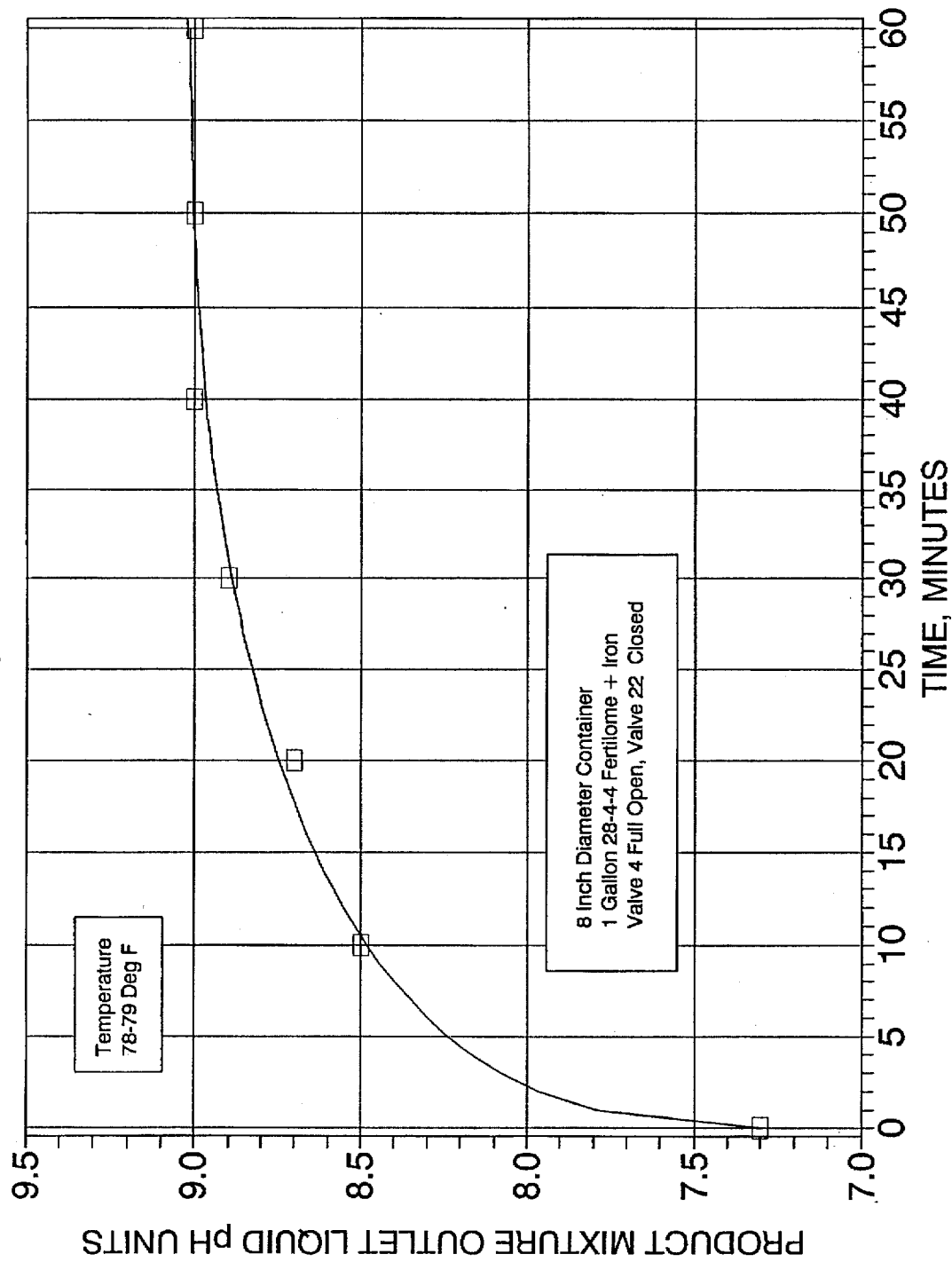
FIGS. 6–11 are graphs representing experimental data accumulated during operation of an 8 inch diameter version of the container filled with specific chemicals.

Referring to FIG. 6 of the drawings, the 8 inch diameter container 8 previously described was filled with one gallon of commercial grade "Fertilome Plus Iron" 28-4-4 mixed, solid, granular fertilizer. The 8 inch diameter container 8 was set to operate full-flow through globe valve 4, which is a ⅜ inch globe valve, and bypass valve 22 was closed. The purpose was investigation of nutrient feeding of a region of lawn during a dispersement period of 60 minutes, using an impulse sprinkler and a ¾ inch garden hose as the ancillary dispersement equipment 34 attached at threaded connector 21. Samples from outlet product vent valve 18 were tested for pH to indicate the progress of the beneficial chemical dispersement. The temperature of fresh supply water during this trial remained at 78–79 degrees fahrenheit. FIG. 6 illustrates that the product outlet liquid pH slowly rose to the original fresh supply water pH of 9.0 during an hour of watering dispersement.

Figure 7:
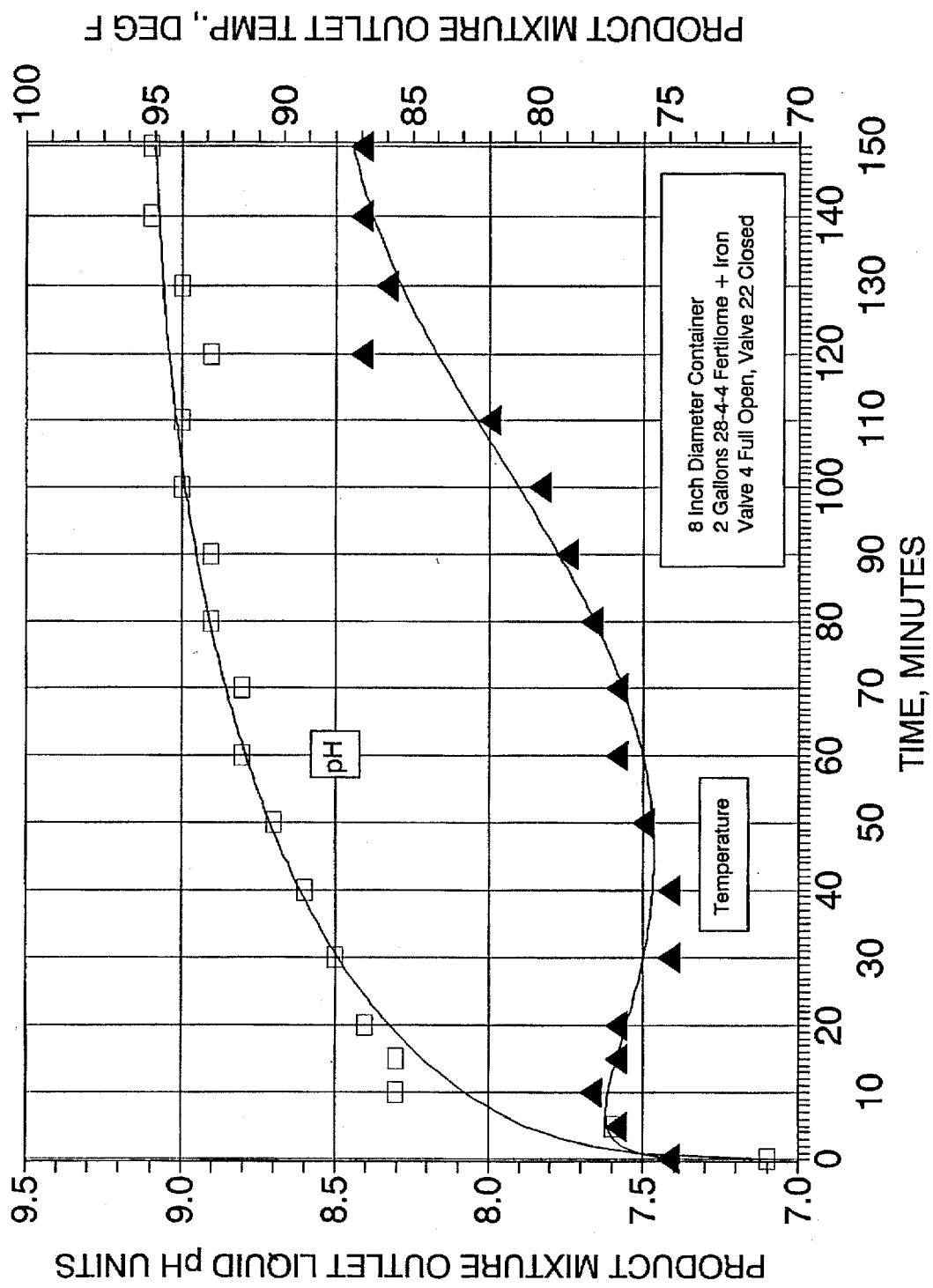

In FIG. 7, the same trial previously described with respect to FIG. 6 was repeated, except that two gallons of commercial grade "Fertilome Plus iron" 28-4-4 mixed, solid, granular, fertilizer were placed in the 8 inch diameter container 8 described earlier. The container 8 was operated full-flow, with globe valve 4 fully opened and bypass valve 22 closed. The duration period of dispersement increased to approximately double the previous trial time, because the quantity of chemical doubled and is only moderately soluble in water. This example shows that the reactive nature of solid chemicals in liquid affects the dispersement time independently of the container design or valve settings.

EXAMPLE VI

Figure 8:
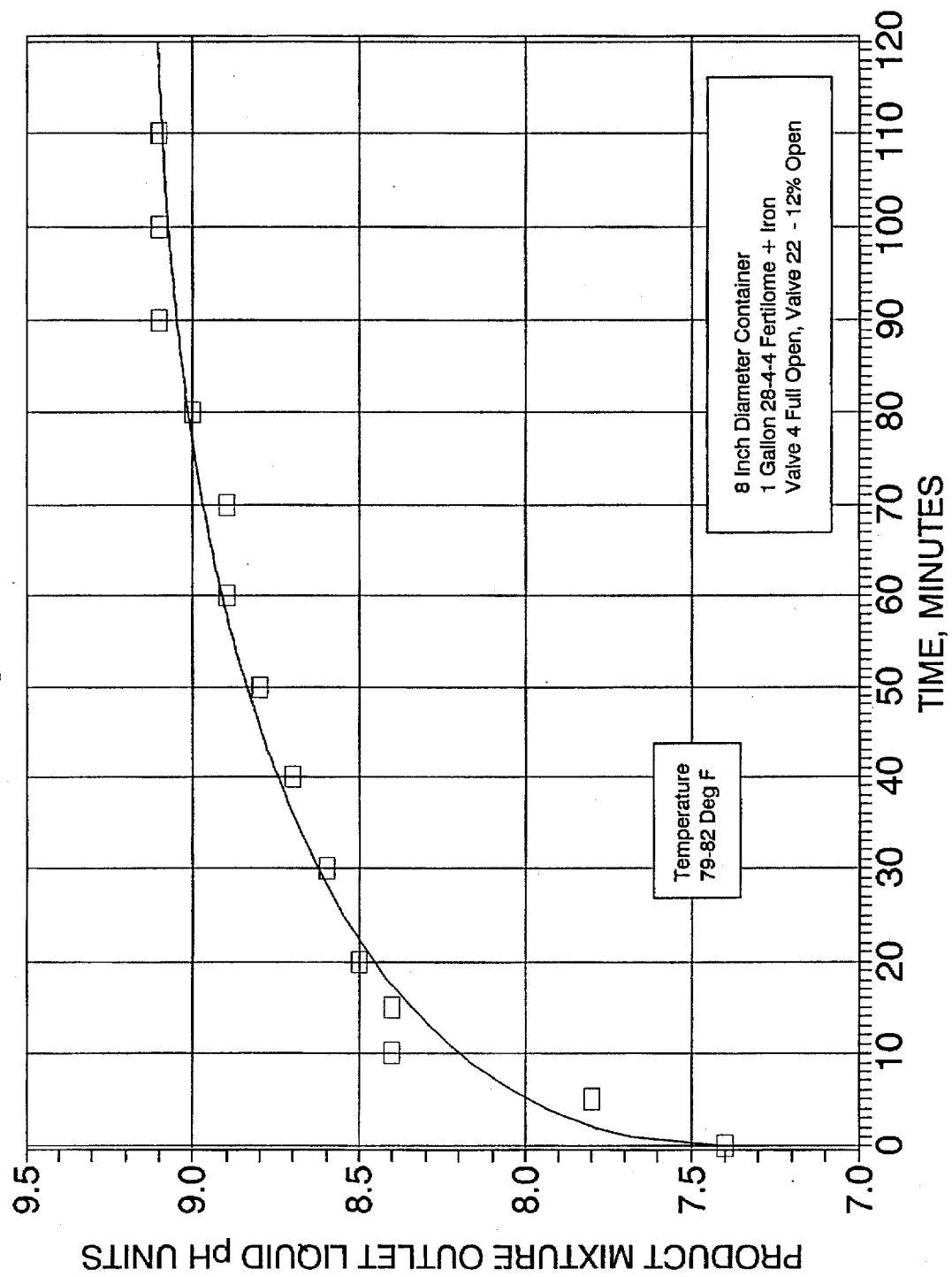

Referring to FIG. 8 of the drawings, the same trial previously described with regard to FIG. 6 was repeated, filling one gallon of commercial grade "Fertilome Plus Iron" 28-4-4 mixed, solid, granular, fertilizer in the 8 inch diameter container 8 described earlier. Bypass valve 22 was 12% open and globe valve 4 was fully open. The pH of trial samples indicates that the length of dispersement time once again doubled, compared to the test shown as FIG. 6, because of product outlet dilution with use of bypass valve 22. Upon completion of the trial referred to in FIG. 8, container 8 was isolated, de-pressured through outlet product vent valve 18, and cover plate 10 of the container 8 was then removed. A minor quantity of the original charged mixed fertilizer did not dissolve, because of insolubility in water. Commonly, mixed solid fertilizers are blended with insoluble materials like clay, intended to be mechanically broadcast over landscape, rather than dissolved. It is therefore important for chemical dissolving containers to be readily cleaned when charged with such mixed solid chemicals. For small containers having sizes ranging from 2–25 gallons, suitable cleaning can be achieved by one or two cycles of draining and refilling with fresh supply liquid. Some minor quantities of undissolved solid chemical of insoluble nature remains in the container, which is of no consequence. These solid chemicals cannot escape through screen 7 and therefore pose no operating problem. For larger containers sized from 50–1000 gallons, spray nozzles may be provided for periodic removal of these solids after container 8 is drained, as heretofore described. Due to the inert nature of these insoluble solids, no environmental hazard is imposed by such cleaning practices and the material may be gathered and used as a bulk filler for landscape, flower beds, and like purposes.

EXAMPLE VII

Another method for measuring concentrations of chemicals in liquids is "Liquid Spectrophotometry". This method measures the depth of color or clarity for concentrations of chemicals admixed or dissolved in liquids such as water, compared with a "blank" sample without dissolved chemicals present. This test method was used to measure the product outlet concentration of petroleum-based beneficial chemicals dispersed while operating a container 8 as illustrated in FIG. 1. Samples were withdrawn from outlet product vent valve 18 during dispersement, as previously described, and compared with clear, potable water fresh source liquid. The clear potable water fresh source liquid was calibrated to equal 100 percent transmittance on a liquid spectrophotometric instrument (not illustrated) set at a specific wavelength of light. Test samples with chemicals read at a lower percent transmittance in the instrument, indicating such chemical presence. The chosen light wavelength to read the samples was determined by scanning a range of light wavelengths to maximize the sensitivity of the instrument for the chemical being tested. In practice, the percent transmittance of product outlet samples during trials would rise until it approached 100%, indicating complete dispersement of the chemical being tested.

Figure 9:
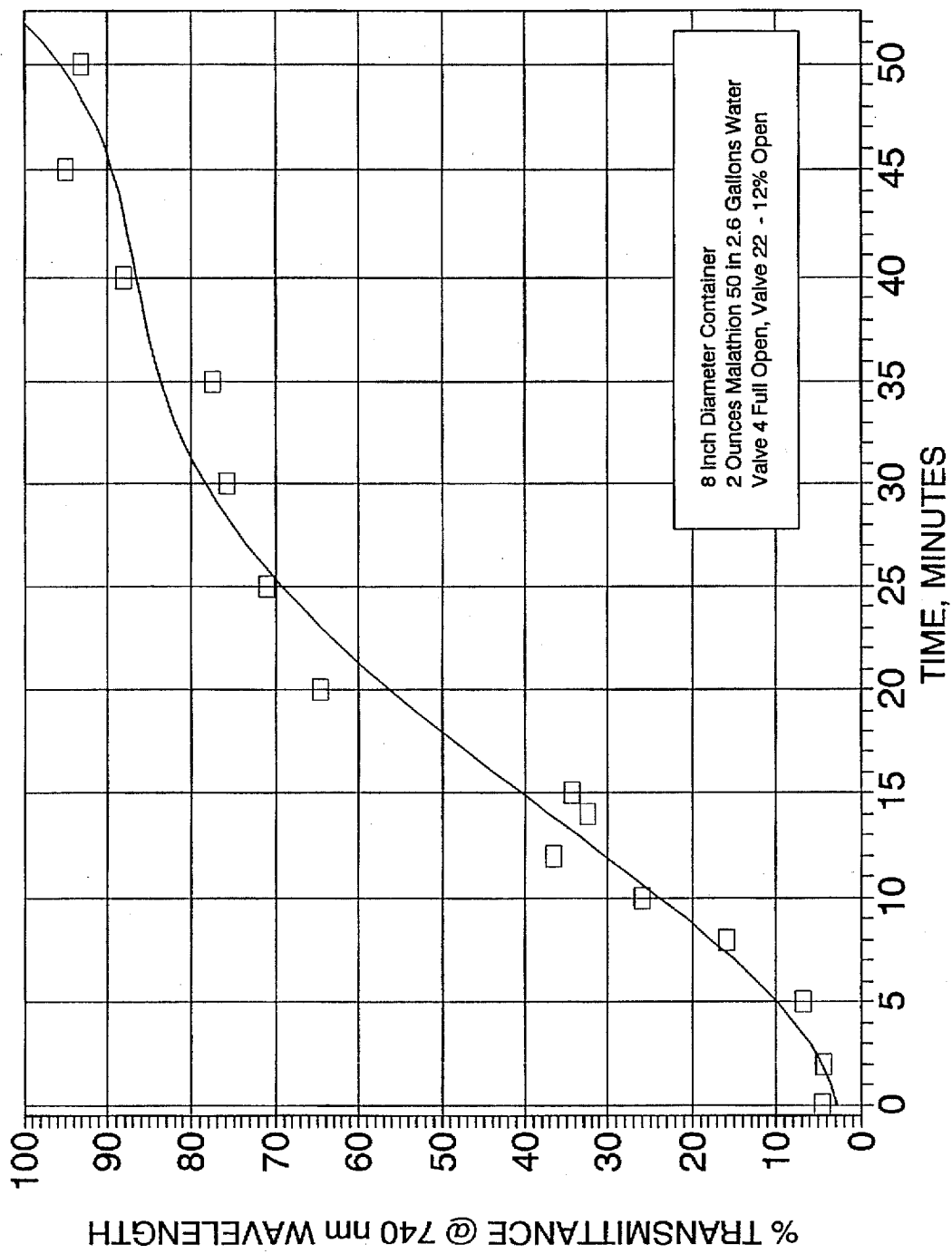

Referring to FIG. 9 of the drawings, the 8 inch diameter container 8 described earlier was charged with two fluid ounces of 50 weight percent Malathion liquid in an inert base. Bypass valve 22 was 12% open and globe valve 4 was fully open. Container 8 was filled with fresh potable water and pressurized. The purpose of this trial was to treat a row of Camellia shrubbery with Malathion during a dispersement period of about 30–45 minutes to eliminate a buildup of fungus on the leaves. The ancillary dispersement equipment 34 attached to threaded connector 21 was a ¾ inch garden hose attached to a manual spray nozzle (not illustrated). Upon opening product mixture outlet valve 24, a sample was withdrawn from outlet product vent valve 18 and read on a liquid spectrophotometer (not illustrated) previously described for percent transmittance. The readings were taken at 740 nanometers light wavelength, which is optimized for this chemical, as described earlier. Over a period of approximately 45 minutes, the Malathion chemical concentration decreased, approaching zero, as shown by the increase in the percent transmittance of the product outlet liquid samples toward 100 percent.

Figure 10:
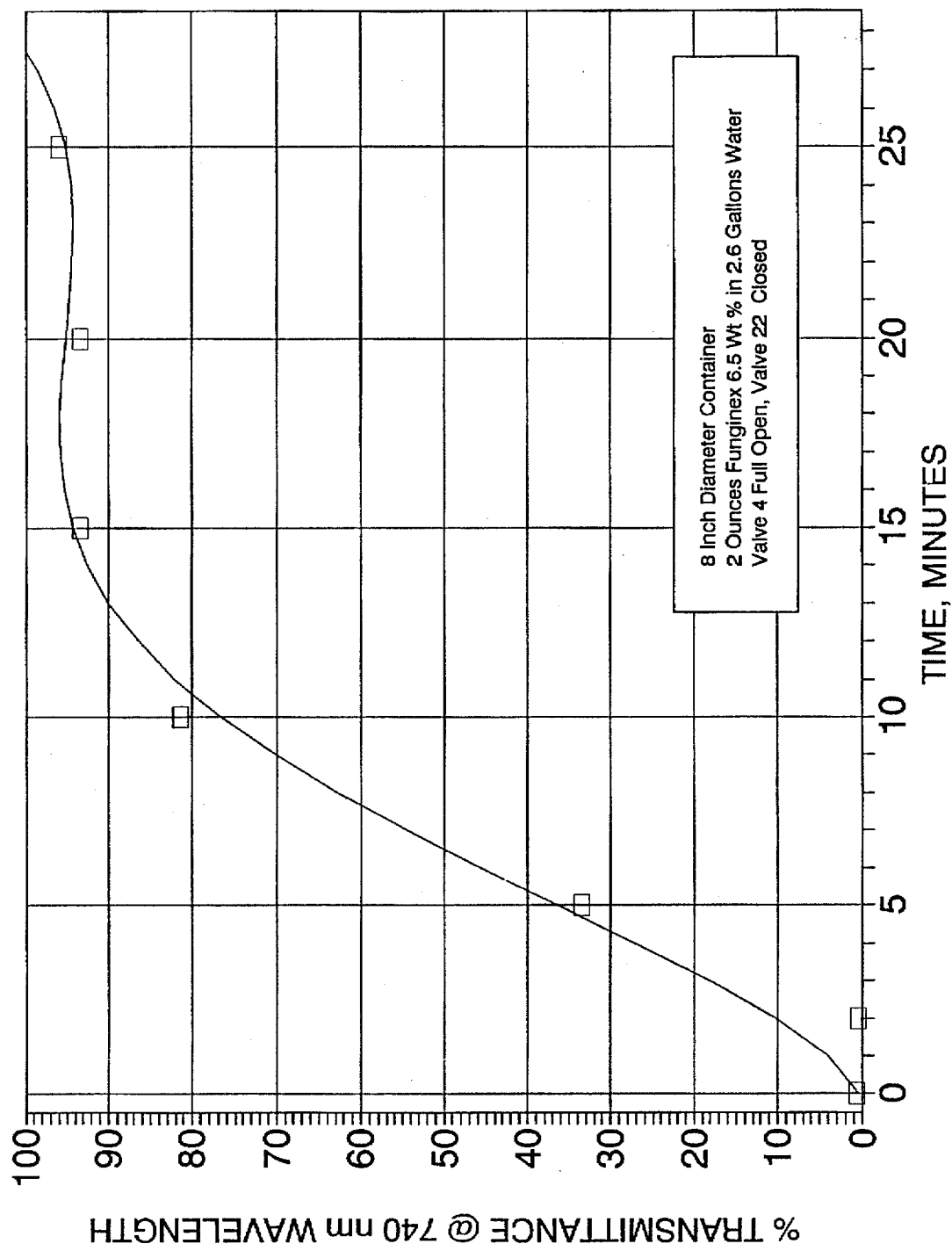

Referring to FIG. 10 of the drawings, the 8 inch diameter container 8 described earlier was charged with two fluid ounces of 6.5 weight percent Funginex liquid in an inert base. Globe valve 4 was fully open and bypass valve 22 closed and container 8 was filled with fresh, potable water and pressurized. The purpose of this trial was to treat a bed of roses with Funginex systemic fungicide during a dispersement period of about 15–25 minutes to prevent "black spot" on the greenery. The ancillary dispersement equipment 34 attached to connector 21 was a ¾ inch garden hose attached to a manual spray nozzle. Upon opening product mixture outlet valve 24, a sample was withdrawn from outlet product vent valve 18 and read on a liquid spectrophotometer (not illustrated) as previously described, for percent transmittance. The readings were taken at 740 nanometers light wavelength, which was optimized for this chemical, as described earlier. Over a period of 25 minutes, the Funginex chemical concentration decreased, approaching zero, as shown by the increase in the percent transmittance of the product outlet liquid samples toward 100 percent over time, in FIG. 10.

EXAMPLE VIII

Figure 11:
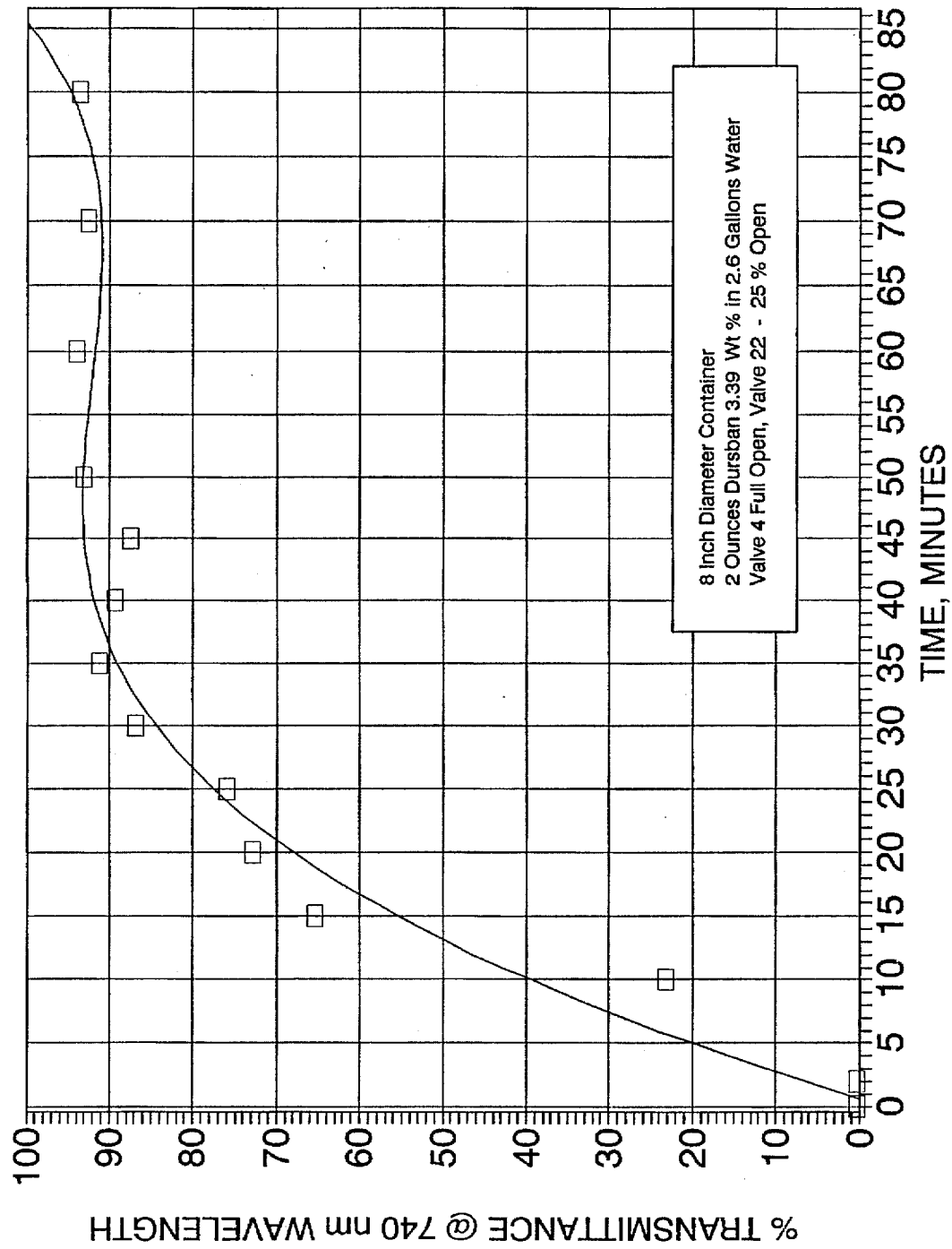

Referring to FIG. 11 of the drawings, the 8 inch diameter container 8 described earlier was charged with two fluid ounces of 3.39 weight percent Dursban liquid in an inert base. Globe valve 4 was fully open and bypass valve 22 was 25 percent open. Container 8 was filled with fresh, potable water and pressurized. The purpose of this trial was to treat an area of grass for ants and brown dog ticks during a dispersement period of about 60 minutes to protect a confined pet. The ancillary dispersement equipment 34 attached to threaded connector 21 was a ¾ inch garden hose attached to a manual spray nozzle. Upon opening product mixture outlet valve 24, a sample was withdrawn from outlet product vent valve 18 and read on a liquid spectrophotometer (not illustrated) previously described, for percent transmittance. The readings were taken at 740 nanometers light wavelength, which was optimized for this chemical as described earlier. Over a period of 85 minutes, the Dursban chemical concentration decreased, approaching zero as shown by the increase in the percent transmittance of the product outlet liquid samples toward 100 percent.

It will be appreciated by those skilled in the art that the chemical dispersing apparatus of this invention is designed for optimum application of beneficial chemicals to a wide variety of living and growing matter using a variety of ancillary dispersement equipment. The design of the container 8, internal screen or screens 7 and the output and bypass piping facilitates chemical treatment in a wide variety of circumstances.

While the preferred embodiments have been described above, it will be recognized and understood that various modifications may be made in the invention and the appended claims are intended to cover all such modifications which may fall within the scope and spirit of the invention.

Having described my invention with the particularity set forth above, what is claimed is:

1. A chemical dispersing apparatus comprising a vertical upright cylindrical container having an integral bottom and a flanged and bolted top main cover, for containing chemicals; at least one vertical, upright, cylindrical screen provided in said container, said screen having an open top end and an open bottom end, with the bottom end of said screen resting adjacent to said bottom of said container, and the top end of said screen positioned adjacent to said top main cover of said container; top and bottom end retainer sleeves attached to said top main cover and said bottom, respectively, for receiving said top end and said bottom end of said screen; screen seal means disposed between said top end of said screen and said cover and between said bottom end of said screen and said bottom of said container, for removably sealing said screen in said container; fluid inlet nozzle means communicating with said container for introducing fluid into said container, mixing the fluid with said chemicals in said container and at least partially dissolving, admixing or displacing said chemicals in the fluid to define a treatment stream; at least one outlet treatment stream nozzle means attached to said top main cover, said outlet treatment stream nozzle means communicating with said top end of said cylindrical screen, whereby said treatment stream is caused to flow through said cylindrical screen and into said outlet treatment stream nozzle means for dispersement outside of said chemical dispersing apparatus.

2. The chemical dispersing apparatus of claim 1 wherein said at least one cylindrical screen comprises at least one pair of cylindrical screens provided in said container and said at least one outlet treatment stream nozzle means comprises a pair of outlet treatment stream nozzle means communicating with said top main cover and said top end of each of said screens for dispersing said treatment stream from said container.

3. The chemical dispersing apparatus of claim 1 comprising chemical filling means provided in said top main cover of said container for introducing the chemicals into said container around said cylindrical screen.

4. The chemical dispersing apparatus of claim 1 wherein said at least one cylindrical screen comprises at least one pair of cylindrical screens provided in said container and said at least one outlet treatment stream nozzle means comprises a pair of outlet treatment stream nozzle means communicating with said top main cover and said top end of each of said screens for dispersing said treatment stream from said container, and comprising chemical filling means provided in said top main cover of said container for introducing the chemicals into said container around said cylindrical screens.

5. The chemical dispersing apparatus of claim 1 comprising at least one drain nozzle means provided in said container and a drain valve connected to said drain nozzle means for selectively draining said container.

6. The chemical dispersing apparatus of claim 5 comprising a chemical filling nozzle provided in said top main cover of said container and a filling valve connected to said chemical filling nozzle for introducing said chemicals into said container around said cylindrical screen.

7. The chemical dispersing apparatus of claim 5 wherein said at least one cylindrical screen comprises at least one pair of cylindrical screens provided in said container and said at least one outlet treatment stream nozzle means comprises a pair of outlet treatment nozzle means communicating with said top main cover and said top end of each of said screens for dispersing said treatment stream from said container.

8. The chemical dispersing apparatus of claim 5 wherein said at least one cylindrical screen comprises at least one pair of cylindrical screens provided in said container and said at least one outlet treatment stream nozzle means comprises a pair of outlet treatment stream nozzle means communicating with said top main cover and said top end of each of said screens for dispersing said treatment stream from said container, and comprising a chemical filling nozzle provided in said top main cover of said container and a filling valve connected to said chemical filling nozzle for introducing said chemicals into said container around said cylindrical screen.

9. The chemical dispersing apparatus of claim 1 comprising cover seal means provided between said container and said top main cover for removably sealing said top main cover on said container.

10. The chemical dispersing apparatus of claim 9 comprising a flanged and bolted chemical filling cover provided in said top main cover of said container for introducing the chemicals into said container.

11. The chemical dispersing apparatus of claim 9 comprising drain nozzle means provided in said container adjacent to said bottom of said container and a drain valve provided in said drain nozzle means, for selectively draining said container.

12. The chemical dispersing apparatus of claim 9 wherein said at least one cylindrical screen comprises at least one pair of cylindrical screens provided in said container and said at least one outlet treatment stream nozzle means comprises a pair of outlet treatment stream nozzle means communicating with said top main cover and said top end of each of said screens for dispersing said treatment stream from said container.

13. The chemical dispersing apparatus of claim 12 comprising:
   (a) a flanged and bolted chemical filling cover provided in said top main cover of said container for introducing the chemicals into said container; and
   (b) a drain nozzle provided in said container adjacent to said bottom of said container and a drain valve provided in said drain nozzle, for selectively draining said container.

14. The chemical dispersing apparatus of claim 1 comprising at least one cleaning nozzle means extending into said container for selectively introducing a cleaning fluid into said container and cleaning said container.

15. The chemical dispersing apparatus of claim 14 comprising cover seal means provided between said container and said top main cover for removably sealing said top main cover on said container and wherein said at least one cylindrical screen comprises at least one pair of cylindrical screens provided in said container and said at least one outlet treatment stream nozzle means comprises a pair of outlet treatment stream nozzle means communicating with said top main cover and said top end of each of said screens for dispensing said treatment stream from said container.

16. The chemical dispersing apparatus of claim 15 comprising:
   (a) a flanged and bolted chemical filling cover provided in said top main cover of said container for introducing said chemicals into said container; and
   (b) a drain nozzle provided in said container adjacent to said bottom of said container and a drain valve provided in said drain nozzle, for selectively draining said container.

17. The chemical dispersing apparatus of claim 1 wherein said screen seal means provided on said bottom end and said top end of said screen for sealing said screen against said bottom and said top main cover, respectively, of said container, each comprises an elastomer gasket seal.

18. The chemical dispersing apparatus of claim 1 comprising bypass conduit means connecting said fluid inlet nozzle means and said outlet treatment stream nozzle means, for selectively adjusting the flow of a first selected quantity of said fluid through said fluid inlet nozzle means and a second selected quantity of said fluid through said bypass conduit means into said outlet treatment stream nozzle means and diluting said treatment stream in said outlet treatment stream nozzle means.

19. The chemical dispersing apparatus of claim 18 comprising top main cover seal means provided between said container and said top main cover for removably sealing said top main cover on said container, and said at least one cylindrical screen comprises at least one pair of cylindrical screens provided in said container and said at least one outlet treatment stream nozzle means comprises a pair of outlet treatment stream nozzle means communicating with said top main cover and said top end of each of said screens for dispersing said treatment stream from said container.

20. The chemical dispersing apparatus of claim 18 wherein said screen seal means provided on said bottom end and said top end of said screen for sealing said screen against said bottom and said top main cover, respectively, of said container, each comprises a elastomer gasket seal and comprising:
   (a) chemical filling cover means provided in said top main cover of said container for introducing said chemicals into said container; and
   (b) drain nozzle means provided in said container and a drain valve connected to said drain nozzle means for selectively draining said container.

21. The chemical dispersing apparatus of claim 18 comprising at least one cleaning nozzle means extending into said container for selectively introducing a cleaning fluid into said container for cleaning said container.

22. The chemical dispersing apparatus of claim 19 comprising:
   (a) a flanged bolted chemical filling cover provided in said top main cover of said container for introducing said chemicals into said container;
   (b) drain nozzle means provided in said container adjacent to said bottom of said container and a drain valve provided in said drain nozzle means, for selectively draining said container; and
   (c) at least one cleaning nozzle means extending into said container for selectively introducing water into said container and cleaning said container.

23. The chemical dispersing apparatus of claim 1 comprising a check valve provided in fluid communication with said fluid inlet nozzle means for preventing reverse flow of the fluid flowing into said container and an inlet fluid intake valve and an inlet fluid globe valve provided in fluid communication with said check valve, for precisely controlling the flow of the fluid into said container.

24. The chemical dispersing apparatus of claim 18 wherein said bypass conduit means comprises an inlet fluid bypass tee provided in fluid communication with said inlet fluid globe valve, a bypass line provided in bypass fluid communication with said inlet fluid bypass tee, a bypass globe valve provided in fluid communication with said inlet fluid bypass tee and said bypass line and a product mixture outlet tee provided in fluid communication with said outlet treatment stream nozzle means and in bypass fluid communication with said bypass line, for bypassing a selected volume of said fluid through said inlet fluid bypass tee, said bypass globe valve, said bypass line and said product mixture outlet tee, around said container.

25. The chemical dispersing apparatus of claim 24 comprising a vent valve provided in fluid communication with said outlet treatment stream nozzle means for sampling the treatment stream from said container.

26. The chemical dispersing apparatus of claim 1 where said container is constructed of a selected metal for selected pressure ratings with capacities ranging from less than about one gallon to about 1000 gallons and said cylindrical screen has a slot opening in the range of from about 0.006 to about 0.020 of an inch.

27. The chemical dispersing apparatus of claim 1 where said container is formed of a selected plastic for selected pressure ratings with capacities ranging from less than about one gallon to about 1000 gallons and said cylindrical screen has a slot opening in the range of from about 0.006 to about 0.020 of an inch.

28. The chemical dispersing apparatus of claim 1 wherein said chemicals are selected from the group, solid, powder, granules, tablets and liquid.

29. The chemical dispersing apparatus of claim 28 comprising selected ancillary connected equipment connected to said outlet treatment stream nozzle means for distributing the treatment stream in a selected manner.

30. A chemical dispersing apparatus comprising a cylindrical container having an integral bottom and a removable top main cover for containing chemicals; at least one pair of cylindrical screens provided in said container, said screens having open top ends and open bottom ends and defining a cylindrical interior, said bottom ends of said cylindrical screens engaging said bottom of said container in removably sealing relationship, and said open top ends of said screens engaging said top main cover of said container in removably sealing relationship; fluid inlet nozzle means communicating with said container for introducing fluid into said container, mixing said fluid with the chemicals in said container and at least partially dissolving, admixing or displacing the chemicals in said liquid to define a treatment stream; and outlet treatment stream nozzle means communicating with said container and said cylindrical interior of said cylindrical screens, whereby said treatment stream is caused to flow through said cylindrical screens, through said cylindrical interior and into said outlet treatment stream nozzle means for dispersement outside of said chemical dispersing apparatus.

31. The chemical dispersing apparatus of claim 30 comprising drain nozzle means provided in said container for selectively draining said container.

32. The chemical dispersing apparatus of claim 30 comprising bypass conduit means connecting said liquid inlet nozzle means and said outlet treatment stream nozzle means, for selectively adjusting the flow of a first selected quantity of said fluid through said fluid inlet nozzle means and a second selected quantity of said fluid through said bypass conduit means into said outlet treatment stream nozzle means and diluting said treatment stream in said outlet treatment stream nozzle means.

33. A method of selectively dispersing chemicals from a container having an inlet nozzle and an outlet nozzle and containing at least one cylindrical screen, said container and said screen defining an annular space surrounding said screen, said method comprising the steps of placing the chemicals in said annular space of said container, introducing a liquid into said container through said inlet nozzle at a selected flow rate and contacting said chemicals with the liquid in a radial and up-flow axial-radial flow pattern of the liquid to at least partially dissolve, admix or displace said chemicals in the liquid, whereby pressure within said container increases until it equalizes with the pressure of the liquid to define a pressurized liquid treatment stream; diverting the liquid and dissolving chemicals through said screen and into said outlet nozzle; and adjusting the flow of liquid from said outlet nozzle for permitting a selected rate of dispersement of said pressurized liquid treatment stream from said container and applying the pressurized liquid treatment stream to the treatment of living matter.

* * * * *